United States Patent
Kim

(10) Patent No.: US 9,674,508 B2
(45) Date of Patent: Jun. 6, 2017

(54) DISPLAY APPARATUS AND A METHOD OF DISPLAYING A THREE-DIMENSIONAL IMAGE USING THE SAME

(71) Applicant: SAMSUNG DISPLAY CO., LTD., Gyeonggi-do (KR)

(72) Inventor: Seon-Ki Kim, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 172 days.

(21) Appl. No.: 13/724,764

(22) Filed: Dec. 21, 2012

(65) Prior Publication Data

US 2014/0015864 A1    Jan. 16, 2014

(30) Foreign Application Priority Data

Jul. 13, 2012    (KR) .................. 10-2012-0076913

(51) Int. Cl.
G09G 5/10        (2006.01)
H04N 13/04       (2006.01)
G09G 3/00        (2006.01)
G09G 3/36        (2006.01)

(52) U.S. Cl.
CPC ............. *H04N 13/04* (2013.01); *G09G 3/003* (2013.01); *H04N 13/0422* (2013.01); *H04N 13/0452* (2013.01); *G09G 3/36* (2013.01); *G09G 2340/0457* (2013.01); *H04N 13/0404* (2013.01); *H04N 13/0409* (2013.01)

(58) Field of Classification Search
CPC ........... G09G 5/346; G09G 2300/0452; G09G 3/003; G09G 3/36; G09G 2340/0457; H04N 13/0404; H04N 13/0415; H04N 13/04; H04N 13/0422; H04N 13/0452; H04N 13/0409; G02B 27/2215
USPC .... 345/690, 694, 696, 698, 419; 348/42–43, 348/51, 54–60
See application file for complete search history.

(56) References Cited

U.S. PATENT DOCUMENTS

| | | | |
|---|---|---|---|
| 6,064,424 A | 5/2000 | Van Berkel et al. | |
| 2002/0003636 A1* | 1/2002 | Conner | 359/15 |
| 2007/0086090 A1* | 4/2007 | Wang et al. | 359/464 |
| 2008/0198185 A1* | 8/2008 | Maruyama et al. | 345/698 |
| 2009/0073556 A1* | 3/2009 | Bent-Gourley | 359/463 |
| 2011/0001806 A1 | 1/2011 | Nakahata et al. | |
| 2011/0298789 A1 | 12/2011 | Ko et al. | |
| 2012/0050290 A1* | 3/2012 | Kobayashi et al. | 345/426 |

FOREIGN PATENT DOCUMENTS

KR    1020100013419 A    2/2010

* cited by examiner

*Primary Examiner* — Jimmy H Nguyen
(74) *Attorney, Agent, or Firm* — F. Chau & Associates, LLC

(57) ABSTRACT

A display apparatus includes a display panel, a light converting element and a display panel driver. The display panel includes a plurality of two-dimensional ("2D") pixels. At least one of the 2D pixels includes a plurality of 2D subpixels. The light converting element is disposed on the display panel. The light converting element includes a three dimensional ("3D") pixel. The 3D pixel corresponds to the plurality of 2D pixels. The 3D pixel includes a plurality of 3D subpixels. The display panel driver is connected to the display panel. The display panel driver renders grayscale data of the 2D subpixels such that the 3D pixel disposed at a first position in a first frame is shifted to a second position in a second frame.

23 Claims, 21 Drawing Sheets

DISPLAY APPARATUS AND A METHOD OF DISPLAYING A THREE-DIMENSIONAL IMAGE USING THE SAME

CROSS-REFERENCE TO RELATED APPLICATION

This application claims priority under 35 U.S.C. §119 to Korean Patent Application No. 10-2012-0076913, filed on Jul. 13, 2012, the disclosure of which is incorporated by reference herein in its entirety.

TECHNICAL FIELD

Exemplary embodiments of the present invention relate to a display apparatus and a method of displaying a three-dimensional ("3D") image using the display apparatus.

DISCUSSION OF THE RELATED ART

A stereoscopic image display may be used to display 3D images. The stereoscopic image display allows a viewer to feel the depth (e.g., 3D effect) of an object by using binocular parallax. Binocular parallax exists due to the eyes of a person being spaced apart from each other by a predetermined distance, and thus, a two-dimensional ("2D") image seen by the left eye is different from that seen by the right eye. The person's brain blends the two different 2D images together to generate a 3D image that is a perspective and realistic representation of the object being viewed.

Stereoscopic image displays may include a stereoscopic type and an auto-stereoscopic type. The stereoscopic type may include an anaglyph type, a shutter glass type and so on. The auto-stereoscopic type may include a lenticular type, a barrier type, a liquid crystal lens type and a liquid crystal barrier type.

To generate a plurality of images for various viewpoints, an auto-stereoscopic type display includes a 3D pixel corresponding to a plurality of 2D pixels. Thus, the resolution and the visibility of a 3D image may decrease compared to a 2D image.

In addition, the size of the 3D pixel is greater than that of the 2D pixels so that a contour of the 3D pixel may be noticed by a viewer. Thus, the display quality of the 3D image may be deteriorated.

SUMMARY

In an exemplary embodiment of the present invention, a display apparatus includes a display panel, a light converting element and a display panel driver. The display panel includes a plurality of two-dimensional ("2D") pixels. At least one of the 2D pixel includes a plurality of 2D subpixels. The light converting element is disposed on the display panel. The light converting element includes a three dimensional ("3D") pixel. The 3D pixel corresponds to the plurality of 2D pixels. The 3D pixel includes a plurality of 3D subpixels. The display panel driver is connected to the display panel. The display panel driver renders grayscale data of the 2D subpixels such that the 3D pixel disposed at a first position in a first frame is shifted to a second position in a second frame.

In an exemplary embodiment of the present invention, the 3D pixel is shifted in a first direction to the second position by a distance corresponding to a size of one of the 3D subpixels.

In an exemplary embodiment of the present invention, the 3D pixel may be shifted in a direction opposite to a first direction so that the 3D pixel is disposed at the first position in a third frame.

In an exemplary embodiment of the present invention, the 3D pixel may be shifted in the direction opposite to the first direction so that the 3D pixel is disposed at a third position in a fourth frame.

In an exemplary embodiment of the present invention, the 3D pixel may be shifted in a first direction so that the 3D pixel is disposed at the first position in a fifth frame.

In an exemplary embodiment of the present invention, the 3D pixel may be shifted in a first direction so that the 3D pixel is disposed at a third position in a third frame.

In an exemplary embodiment of the present invention, the 3D pixel may be shifted in a direction opposite to the first direction so that the 3D pixel is disposed at the first position in a fourth frame.

In an exemplary embodiment of the present invention, the 3D pixel may be shifted in a first direction or in a direction opposite to the first direction every four frames.

In an exemplary embodiment of the present invention, the 3D pixel may be shifted in a first direction or in a direction opposite to the first direction every three frames.

In an exemplary embodiment of the present invention, the first direction may be a vertical direction of the display panel.

In an exemplary embodiment of the present invention, the 3D pixel may correspond to six 2D pixels which are disposed in a three by two matrix.

In an exemplary embodiment of the present invention, the 3D pixel may correspond to nine 2D pixels which are disposed in a three by three matrix.

In an exemplary embodiment of the present invention, the light converting element may include a lenticular lens.

In an exemplary embodiment of the present invention, the light converting element may include a liquid crystal lens module turned off in a 2D mode and turned on in a 3D mode.

In an exemplary embodiment of the present invention, a method of displaying a 3D image using a display panel including a plurality of two-dimensional ("2D") pixels, at least one of the 2D pixels including a plurality of 2D subpixels, includes rendering grayscale data of the 2D subpixels such that a 3D pixel is disposed at a first position in a first frame, the 3D pixel corresponding to the plurality of 2D pixels, the 3D pixel including a plurality of 3D subpixels and rendering grayscale data of the 2D subpixels such that the 3D pixel is shifted to a second position in a second frame.

In an exemplary embodiment of the present invention, the 3D pixel may be shifted in a first direction to the second position by a distance corresponding to a size of one of the 3D subpixels.

In an exemplary embodiment of the present invention, the 3D pixel may be shifted in a direction opposite to a first direction so that the 3D pixel is disposed at the first position in a third frame.

In an exemplary embodiment of the present invention, the 3D pixel may be shifted in the direction opposite to the first direction so that the 3D pixel is disposed at a third position in a fourth frame.

In an exemplary embodiment of the present invention, the 3D pixel may be shifted in the first direction so that the 3D pixel is disposed at the first position in a fifth frame.

In an exemplary embodiment of the present invention, the 3D pixel may be shifted in a first direction so that the 3D pixel is disposed at a third position in a third frame.

In an exemplary embodiment of the present invention, the 3D pixel may be shifted in a direction opposite to the first direction so that the 3D pixel is disposed at the first position in a fourth frame.

In an exemplary embodiment of the present invention, the 3D pixel may be shifted in a first direction or in a direction opposite to the first direction every four frames.

In an exemplary embodiment of the present invention, the 3D pixel may be shifted in a first direction or in a direction opposite to the first direction every three frames.

In an exemplary embodiment, the first direction may be a vertical direction of the display panel.

In an exemplary embodiment of the present invention, a display apparatus includes a display panel including a plurality of two-dimensional ("2D") pixels, a light converting element including a three-dimensional ("3D") pixel corresponding to the plurality of 2D pixels, and a display panel driver configured to change a grayscale of at least one of the plurality of 2D pixels so that the 3D pixel shifts in a first or second direction when an image frame changes.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF EXEMPLARY EMBODIMENTS

Figure 1:
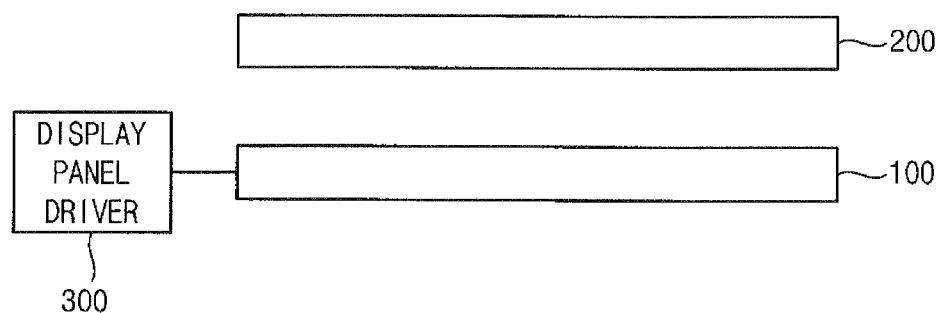
FIG. 1 is a block diagram illustrating a display apparatus according to an exemplary embodiment of the present invention.

Hereinafter, exemplary embodiments of the present invention will be described in further detail with reference to the accompanying drawings. The present invention may, however, be embodied in many different forms and should not be construed as being limited to the embodiments set forth herein. Like reference numerals may denote like or similar elements throughout the specification and the drawings.

It will be understood that when an element is referred to as being "on," "connected to" or "coupled to" another element, it can be directly on, connected to or coupled to the other element or intervening elements may be present.

As used herein, the singular forms "a," "an" and "the" are intended to include the plural forms as well, unless the context clearly indicates otherwise.

Figure 2:
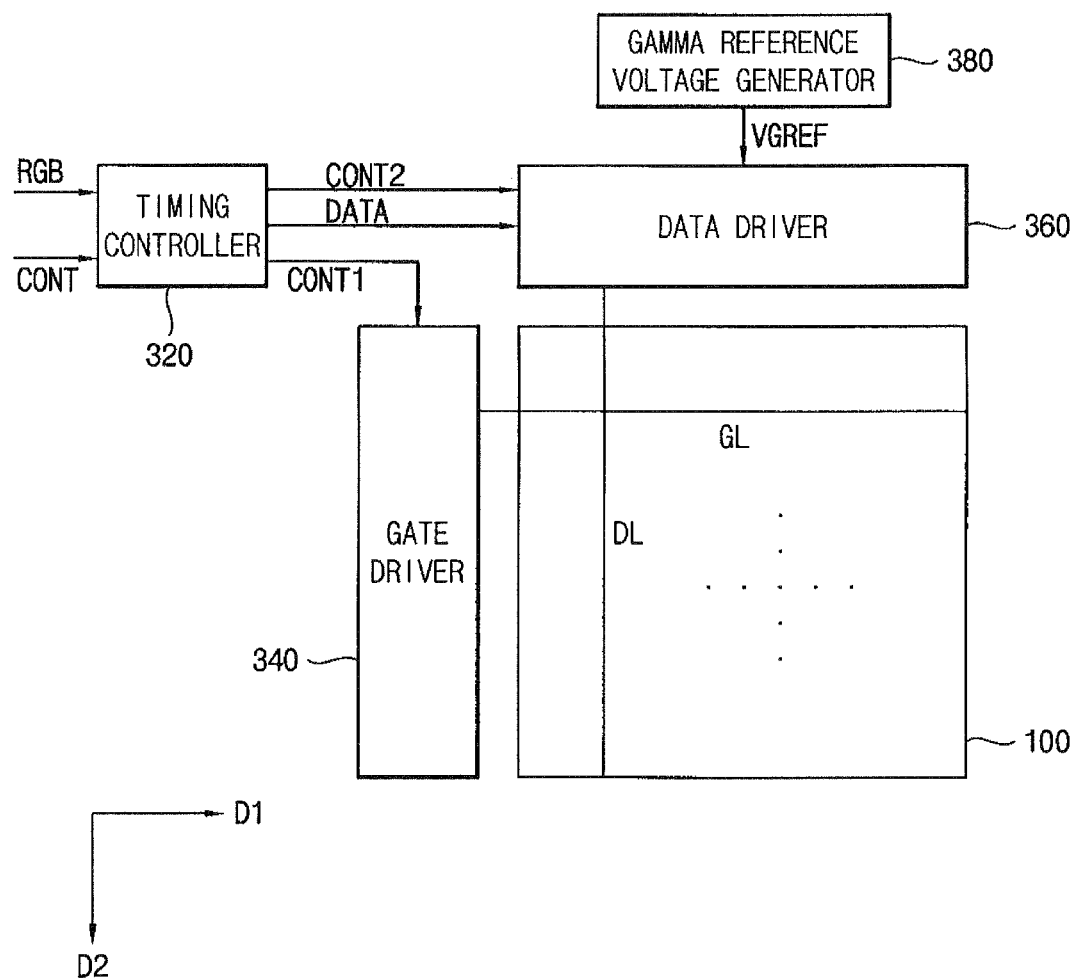
FIG. 2 is a block diagram illustrating a display panel and a display panel driver of FIG. 1.

FIG. 1 is a block diagram illustrating a display apparatus according to an exemplary embodiment of the present invention. FIG. 2 is a block diagram illustrating a display panel and a display panel driver of FIG. 1.

Referring to FIGS. 1 and 2, the display apparatus includes a display panel 100, a light converting element 200 and a display panel driver 300.

The display panel 100 displays an image. The display panel 100 may include a first substrate, a second substrate facing the first substrate and a liquid crystal layer disposed between the first and second substrates. The display panel 100 may be various other display panels, such as an organic light emitting display panel, a plasma display panel, an electrophoretic display panel, an electro-wetting display panel, etc.

The display panel 100 includes a plurality of two-dimensional ("2D") pixels. Each 2D pixel includes a plurality of 2D subpixels. A 2D subpixel may be a 2D red subpixel, a 2D green subpixel and a 2D blue subpixel.

The display panel 100 includes a plurality of gate lines GL and a plurality of data lines DL. The 2D subpixels are connected to the gate lines GL and the data lines DL. The gate lines GL extend in a first direction D1. The date lines DL extend in a second direction D2 crossing the first direction D1.

Each 2D subpixel includes a switching element and a liquid crystal capacitor electrically connected to the switching element. The 2D subpixel may further include a storage capacitor. The 2D subpixels are disposed in a matrix form. The switching element may be a thin film transistor. The thin film transistor may include a gate electrode, a source electrode, and a drain electrode. The gate electrode may be connected to a corresponding one of the gate lines GL. The source electrode may be connected to a corresponding one of the data lines DL. The drain electrode may be connected to the liquid crystal capacitor and the storage capacitor. The liquid crystal capacitor and the storage capacitor may be connected to the drain electrode in parallel.

The gate lines GL, the data lines DL, pixel electrodes and storage electrodes may be disposed on the first substrate. A common electrode may be disposed on the second substrate.

The display panel 100 may display a 2D image in a 2D mode. The display panel 100 may display a three-dimensional ("3D") image in a 3D mode.

The light converting element 200 is disposed on the display panel 100. The light converting element 200 converts a 2D image displayed by the display panel 100 into a 3D image. For example, the light converting element 200 transmits an image displayed on the 2D subpixel of the display panel 100 to a plurality of viewpoints.

The light converting element 200 may constitute a 3D pixel. The 3D pixel corresponds to a plurality of the 2D pixels. The 3D pixel includes a plurality of 3D subpixels.

A 2D pixel structure and a 3D pixel structure of the display panel 100 are described in detail with reference to FIG. 3.

The light converting element 200 has a light converting axis. The light converting axis may be inclined with respect to the data line DL of the display panel 100.

For example, the light converting element 200 includes a plurality of lenticular lenses. The lenticular lenses may refract the image displayed on the 2D subpixel of the display panel 100 to the viewpoints. The lenticular lenses may be disposed in the first direction D1. The lenticular lenses may extend in the second direction D2 crossing the first direction D1. Alternatively, the lenticular lenses may extend in an inclined direction with respect to the second direction D2. The light converting axis may be equal or substantially equal to a lens axis of the lenticular lens which is parallel or substantially parallel to an extending direction of the lenticular lens.

For example, the light converting element 200 includes a plurality of barriers. The barriers may selectively block an image displayed on the 2D subpixel of the display panel 100 so that the image displayed on the display panel 100 is transmitted to the viewpoints. The barriers may be disposed in the first direction D1. The barriers may extend in the second direction D2 crossing the first direction D1. Alternatively, the barriers may extend in an inclined direction with respect to the second direction D2. The light converting axis may be equal or substantially equal to a barrier axis which is parallel or substantially parallel to an extending direction of the barrier.

For example, the light converting element 200 may be a lens module which is operated according to a driving mode including the 2D mode and the 3D mode. For example, the light converting element 200 may be a liquid crystal lens module. The lens module is turned on or off in response to the driving mode. For example, the lens module is turned off in the 2D mode so that the display apparatus displays a 2D image. The lens module is turned on in the 3D mode so that the display apparatus displays a 3D image.

The lens module includes a first lens substrate, a second lens substrate facing the first lens substrate and a lens liquid crystal layer disposed between the first and second lens substrates.

In the 3D mode, the lens module includes a plurality of unit lenses which function as the lenticular lenses. The unit lenses may refract an image displayed on the 2D subpixel of the display panel 100 to the viewpoints. The light converting axis may be equal or substantially equal to a lens axis of the unit lens which is parallel or substantially parallel to an extending direction of the unit lens.

For example, the unit lens may be a Fresnel lens including a plurality of divided lens areas. Each of the lens areas may include a plurality of lens electrodes.

For example, the light converting element 200 may be a barrier module which is operated according to the driving mode including the 2D mode and the 3D mode. For example, the light converting element 200 may be a liquid crystal barrier module. The barrier module is turned on or off in response to the driving mode. For example, the barrier module is turned off in the 2D mode so that the display apparatus displays a 2D image. The barrier module is turned on in the 3D mode so that the display apparatus displays a 3D image.

The barrier module includes a first barrier substrate, a second barrier substrate facing the first barrier substrate and a barrier liquid crystal layer disposed between the first and second barrier substrates.

In the 3D mode, the barrier module includes a plurality of unit barriers which function as the barriers. The unit barriers may selectively block an image displayed on the 2D subpixel of the display panel 100 so that the image displayed on the 2D subpixel of the display panel 100 is transmitted to the viewpoints. The light converting axis may be equal or substantially equal to a unit barrier axis which is parallel or substantially parallel to an extending direction of the unit barrier.

Alternatively, the light converting element 200 may include a plurality of prisms that change a path of light. Alternatively, the light converting element 200 may include a holographic element that changes a path of light.

The display panel driver 300 is connected to the display panel 100 and drives the display panel 100. The display panel driver 300 includes a timing controller 320, a gate driver 340, a data driver 360 and a gamma reference voltage generator 380.

The timing controller 320 receives input image data RGB and an input control signal CONT from an external apparatus. The input image data RGB may include red image data R, green image data G and blue image data B. The input control signal CONT may include a master clock signal, a data enable signal, a vertical synchronizing signal and a horizontal synchronizing signal.

The timing controller 320 generates a first control signal CONT1, a second control signal CONT2 and a data signal DATA based on the input image data RGB and the input control signal CONT.

The timing controller 320 generates the first control signal CONT1 to control a driving timing of the gate driver 340 based on the input control signal CONT, and outputs the first control signal CONT1 to the gate driver 340. The first control signal CONT1 may include a vertical start signal and a gate clock signal.

The timing controller 320 generates the second control signal CONT2 to control a driving timing of the data driver 360 based on the input control signal CONT, and outputs the second control signal CONT2 to the data driver 360. The second control signal CONT2 may include a horizontal start signal and a load signal.

The timing controller 320 generates the data signal DATA based on the input image data RGB, and outputs the data signal DATA to the data driver 360.

The gate driver 340 receives the first control signal CONT1 from the timing controller 320. The gate driver 340 generates gate signals for driving the gate lines GL in response to the first control signal CONT1. The gate driver 340 sequentially outputs the gate signals to the gate lines GL.

The gamma reference voltage generator 380 generates a gamma reference voltage VGREF. The gamma reference voltage generator 380 provides the gamma reference voltage VGREF to the data driver 360. The gamma reference voltage VGREF has a value corresponding to the data signal DATA.

For example, the gamma reference voltage generator 380 includes a resistor string circuit having a plurality of resistors connected in series. The resistor string circuit generates the gamma reference voltage VGREF, e.g., by dividing a source voltage and a ground voltage. The gamma reference voltage generator 380 may be disposed in the data driver 360.

The data driver 360 receives the second control signal CONT2 and the data signal DATA from the timing controller 320. The data driver 360 receives the gamma reference voltage VGREF from the gamma reference voltage generator 380.

The data driver 360 converts the data signal DATA into analog-type data voltages using the gamma reference voltage VGREF. The data driver 360 outputs the data voltages to the data lines DL.

The display panel driver 300 may further include a frame rate converter that is connected to the timing controller 320 and that converts a frame rate of the input image data RGB.

An operation and a structure of the display panel driver 300 are described in detail with reference to FIG. 4.

Figure 3:
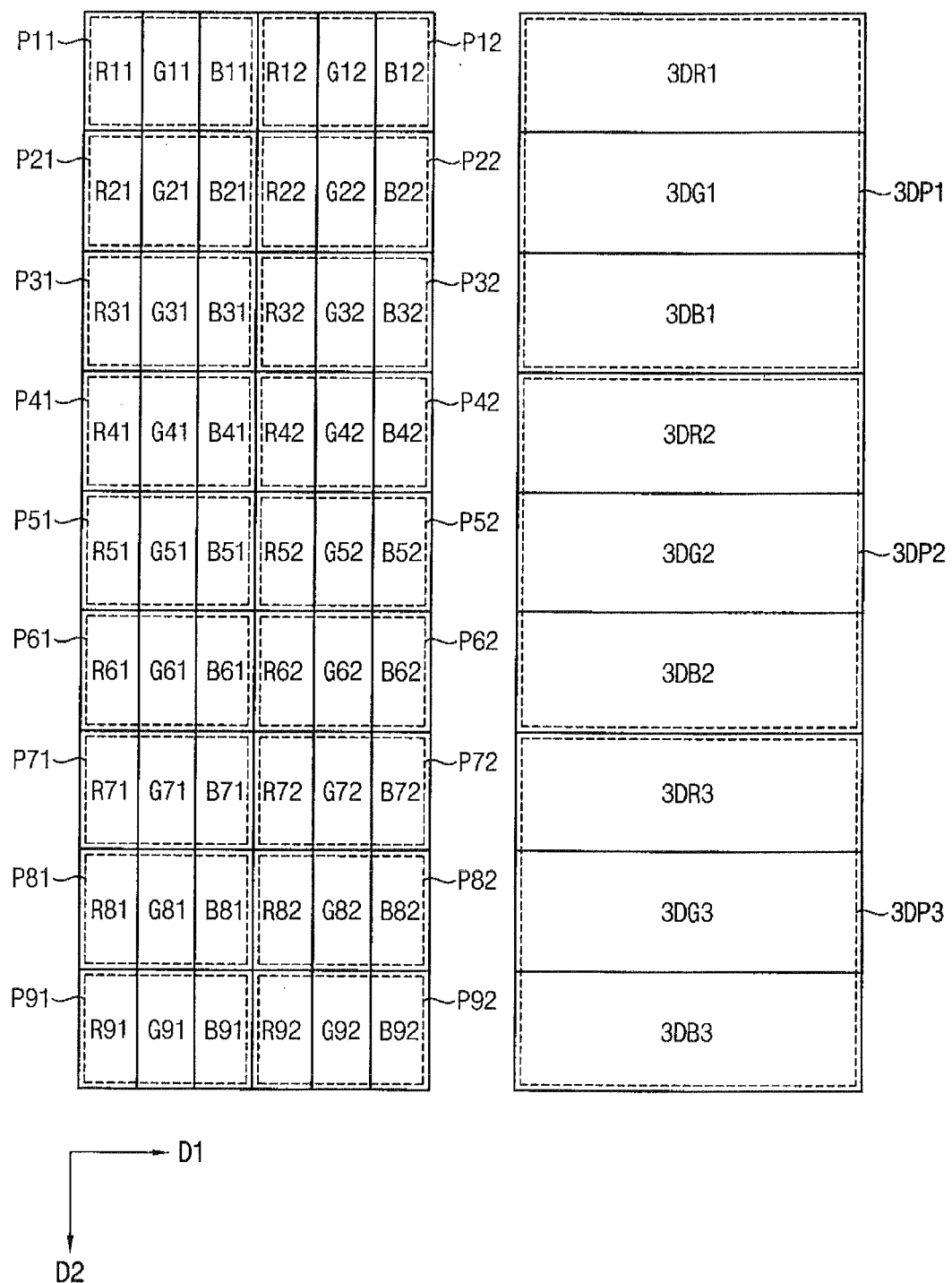
FIG. 3 is a plan view illustrating a two-dimensional ("2D") pixel structure and a three-dimensional ("3D") pixel structure of the display panel of FIG. 1.

FIG. 3 is a plan view illustrating the 2D pixel structure and the 3D pixel structure of the display panel of FIG. 1.

Referring to FIGS. 1 to 3, the display panel 100 includes a plurality of 2D pixels P11 to P92. The 2D pixels P11 to P92 are disposed in a matrix form. For example, the display panel 100 may have a resolution of 3840×2160. In other words, 4K resolution. However, the display panel 100 may have higher or lesser resolutions.

Each of the 2D pixels P11 to P92 includes a plurality of 2D subpixels R11 to B92. For example, the 2D subpixel has a rectangular shape. The 2D subpixel may have a relatively shorter side extending in the first direction D1 and a relatively longer side extending in the second direction D2. The 2D subpixel may have other shapes, for example, a square shape.

A first 2D pixel P11 includes a first 2D red subpixel R11, a first 2D green subpixel G11 and a first 2D blue subpixel B11. The 2D subpixels may not always be disposed in a sequence of red, green and blue.

A second 2D pixel P12 is disposed adjacent to the first 2D pixel P11 in the first direction D1. The second 2D pixel P12 includes a second 2D red subpixel R12, a second 2D green subpixel G12 and a second 2D blue subpixel B12.

A third 2D pixel P21 is disposed adjacent to the first 2D pixel P11 in the second direction D2. The third 2D pixel P21 includes a third 2D red subpixel R21, a third 2D green subpixel G21 and a third 2D blue subpixel B21.

A fourth 2D pixel P22 is disposed adjacent to the third 2D pixel P21 in the first direction D1. The fourth 2D pixel P22 includes a fourth 2D red subpixel R22, a fourth 2D green subpixel G22 and a fourth 2D blue subpixel B22.

A fifth 2D pixel P31 is disposed adjacent to the third 2D pixel P21 in the second direction D2. The fifth 2D pixel P31 includes a fifth 2D red subpixel R31, a fifth 2D green subpixel G31 and a fifth 2D blue subpixel B31.

A sixth 2D pixel P32 is disposed adjacent to the fifth 2D pixel P31 in the first direction D1. The sixth 2D pixel P32 includes a sixth 2D red subpixel R32, a sixth 2D green subpixel G32 and a sixth 2D blue subpixel B32.

A pixel group including seventh to twelfth 2D pixels P41 to P62 are disposed adjacent to a pixel group including the first to sixth 2D pixels P11 to P32 in the second direction D2. The seventh to twelfth 2D pixels P41 to P62 are arranged in the same or substantially the same pattern as the first to sixth 2D pixels P11 to P32.

A pixel group including thirteenth to eighteenth 2D pixels P71 to P92 are disposed adjacent to the pixel group including the seventh to twelfth 2D pixels P41 to P62 in the second direction D2. The thirteenth to eighteenth 2D pixels P71 to P92 are arranged in the same or substantially the same pattern as the seventh to twelfth 2D pixels P41 to P62.

The 3D pixels 3DP1 to 3DP3 are included in the light converting element 200. Each of the 3D pixels 3DP1 to 3DP3 corresponds to a plurality of the 2D pixels.

In an exemplary embodiment of the present invention, one 3D pixel corresponds to six 2D pixels which are disposed in a three by two matrix. For example, a first 3D pixel 3DP1 corresponds to the first to sixth 2D pixels P11 to P32. A second 3D pixel 3DP2 corresponds to the seventh to twelfth 2D pixels P41 to P62. A third 3D pixel 3DP3 corresponds to the thirteenth to eighteenth 2D pixels P71 to P92. However, one 3D pixel may correspond to more or less than six 2D pixels. Further, the 2D pixels to which the 3D pixel corresponds do not have to be arranged in a matrix.

For example, when the display panel 100 has a 2D resolution of 3840×2160, a 3D resolution of the display apparatus may be 1920×720. Since a human's eyes are relatively sensitive to a horizontal resolution, by decreasing the horizontal resolution by a ½, the horizontal resolution of the 3D image may be set to a horizontal resolution of a full HD (High Definition) image.

Each of the 3D pixels 3DP1 to 3DP3 includes a plurality of 3D subpixels. For example, the 3D subpixel has a rectangular shape. The 3D subpixel may have a relatively longer side extending in the first direction D1 and a relatively shorter side extending in the second direction D2. In an exemplary embodiment of the present invention, one 3D subpixel corresponds to six 2D subpixels which are disposed in a one by six matrix. The 3D subpixel may have other shapes, for example, a square shape.

The first 3D pixel 3DP1 includes a first 3D red subpixel 3DR1, a first 3D green subpixel 3DG1 and a first 3D blue subpixel 3 DB1.

The second 3D pixel 3DP2 is disposed adjacent to the first 3D pixel 3DP1 in the second direction D2. The second 3D pixel 3DP2 includes a second 3D red subpixel 3DR2, a second 3D green subpixel 3DG2 and a second 3D blue subpixel 3 DB2.

The third 3D pixel 3DP3 is disposed adjacent to the second 3D pixel 3DP2 in the second direction D2. The third 3D pixel 3DP3 includes a third 3D red subpixel 3DR3, a third 3D green subpixel 3DG3 and a third 3D blue subpixel 3 DB3.

The 3D pixels 3DP1 to 3DP3 are not physically fixed. The 3D pixels 3DP1 to 3DP3 may be in various positions according to grayscale data rendered in the 2D subpixels.

The 3D subpixels are not always disposed in a sequence of red, green and blue. The sequence of colors of the 3D subpixels may vary according to a viewpoint of a viewer. For example, in a first viewpoint of the viewer, the 3D red subpixel, the 3D green subpixel and the 3D blue subpixel may be sequentially disposed. For example, in a second viewpoint of the viewer, the 3D green subpixel, the 3D blue subpixel and the 3D red subpixel may be sequentially disposed. For example, in a third viewpoint of the viewer, the 3D blue subpixel, the 3D red subpixel and the 3D green subpixel may be sequentially disposed.

Although 2D subpixels arranged in nine rows and six columns are illustrated in FIG. 3, the 2D subpixels represent a portion of the display panel 100. For example, the 2D subpixels arranged in nine rows and six columns may be repeated along the first and second directions D1 and D2.

Figure 4:
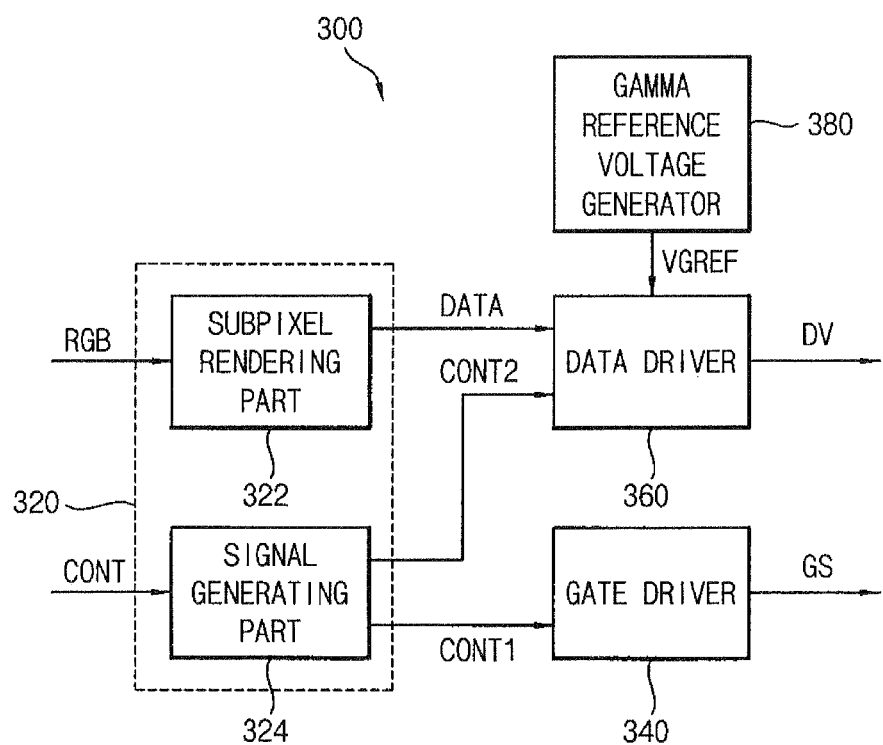
FIG. 4 is a block diagram illustrating the display panel driver of FIG. 1.

FIG. 4 is a block diagram illustrating the display panel driver 300 of FIG. 1.

Referring to FIGS. 1 to 4, the display panel driver 300 includes the timing controller 320, the gate driver 340, the data driver 360 and the gamma reference voltage generator 380.

The timing controller 320 includes a subpixel rendering part 322 and a signal generating part 324.

The subpixel rendering part 322 receives the input image data RGB from an external apparatus. The input image data RGB may include the red image data R, the green image data G and the blue image data B.

The subpixel rendering part 322 generates grayscale data DATA for the 2D subpixels based on the input image data RGB. The subpixel rendering part 322 may perform subpixel rendering on the 2D subpixels such that some of the 2D subpixels represent different grayscales for the same input image data.

The subpixel rendering operation of the subpixel rendering part may be described in detail with reference to FIGS. 5A to 5D and 6A to 6B.

The signal generating part 324 receives the input control signal CONT from an external apparatus. The input control signal CONT may include a master clock signal, a data enable signal, a vertical synchronizing signal and a horizontal synchronizing signal.

The signal generating part 324 generates a first control signal CONT1 for controlling an operation of the gate driver 340 based on the input control signal CONT. The signal generating part 324 outputs the first control signal CONT1 to the gate driver 340. The first control signal CONT1 may include a vertical start signal and a gate clock signal.

The signal generating part 324 generates a second control signal CONT2 for controlling an operation of the data driver 360 based on the input control signal CONT. The signal generating part 324 outputs the second control signal CONT2 to the data driver 360. The second control signal CONT2 may include a horizontal start signal and a load signal.

The timing controller 320 may further include an image compensating part that compensates for the grayscale data DATA. The image compensating part may perform an adaptive color correction process and a dynamic capacitance compensation process to compensate for the grayscale data DATA.

The gate driver 340 receives the first control signal CONT1 from the signal generating part 324. The gate driver 340 generates gate signals GS for driving the gate lines of the display panel 100 in response to the first control signal CONT1. The gate driver 340 sequentially outputs the gate signals GS to the gate lines of the display panel 100.

The gate driver 340 may be directly mounted on the display panel 100. Alternatively, the gate driver 340 may be connected to the display panel 100 in a tape carrier package ("TCP") type. Alternatively, the gate driver 340 may be integrated on the display panel 100.

The data driver 360 receives the second control signal CONT2 from the signal generating part 324 and the image data DATA from the subpixel rendering part 322. The data driver 360 receives the gamma reference voltage VGREF from the gamma reference voltage generator 380.

The data driver 360 converts the image data DATA into analog-type data voltages DV using the gamma reference voltage VGREF in response to the second control signal CONT2 from the signal generating part 324. The data driver 360 outputs the data voltages DV to the data lines DS of the display panel 100.

The data driver 360 may be directly mounted on the display panel 100. Alternatively, the data driver 360 may be connected to the display panel 100 as a TCP type. Alternatively, the data driver 360 may be integrated on the display panel 100.

Figure 5A:
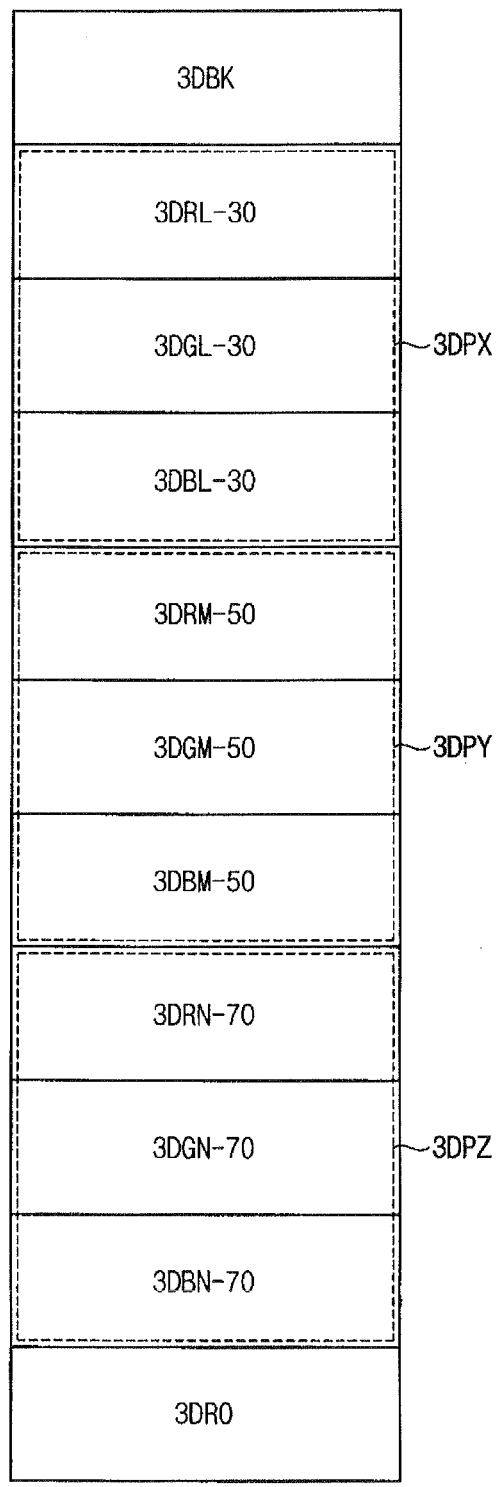
FIG. 5A is a diagram illustrating a subpixel rendering method for the display panel of FIG. 1 in a first frame.
Figure 5B:
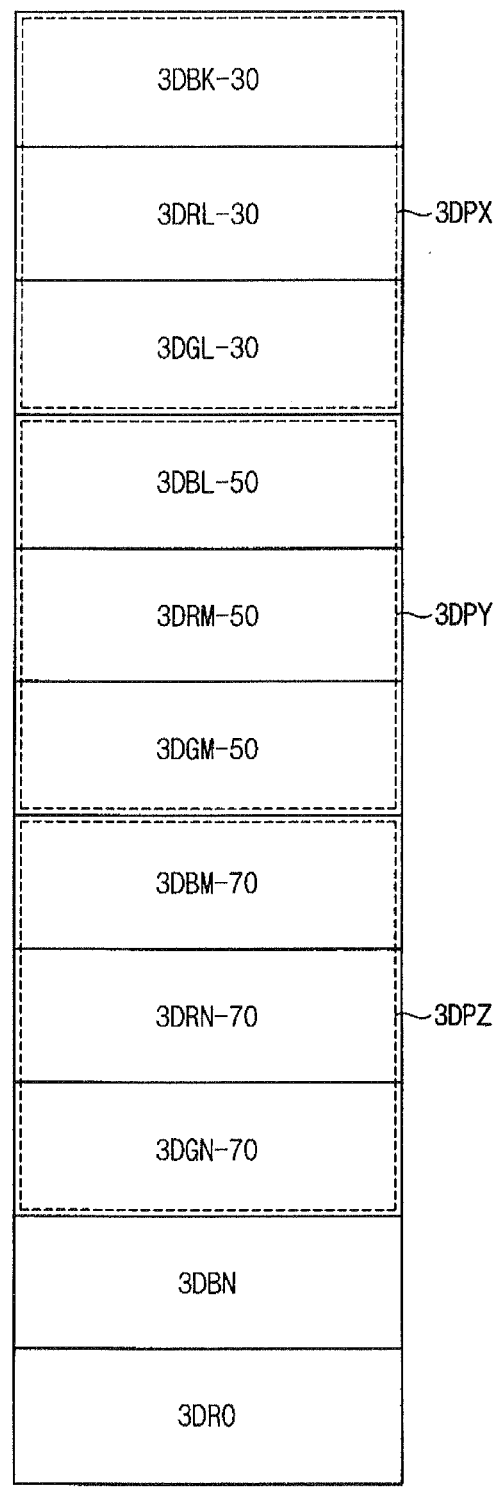
FIG. 5B is a diagram illustrating the subpixel rendering method for the display panel of FIG. 1 in a second frame.
Figure 5C:
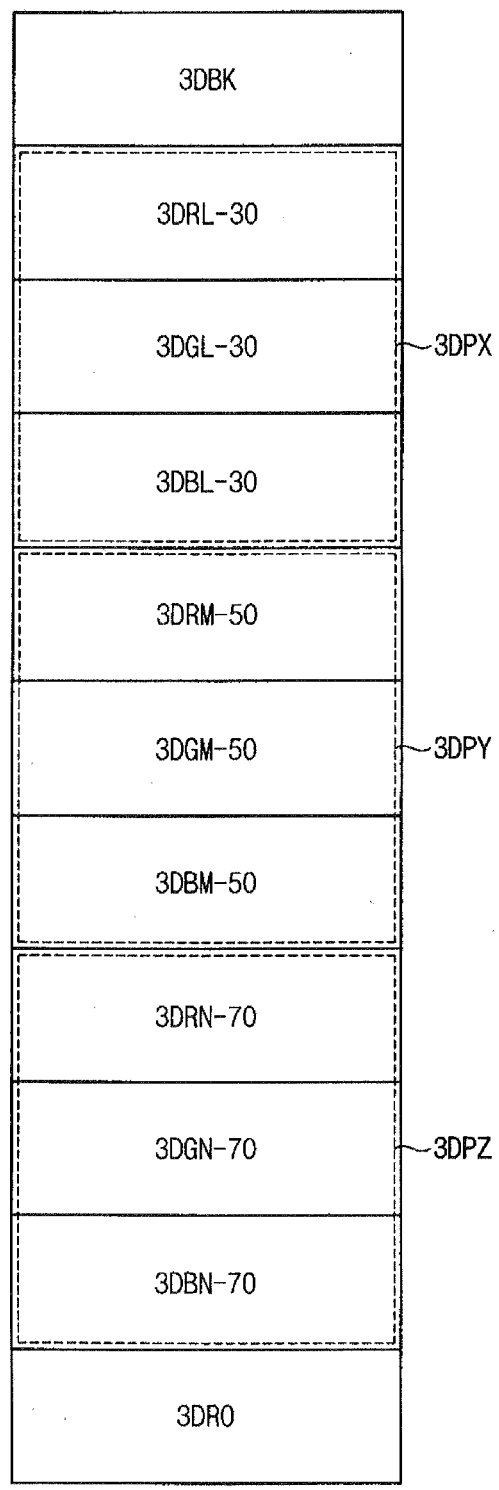
FIG. 5C is a diagram illustrating the subpixel rendering method for the display panel of FIG. 1 in a third frame.

FIG. 5A is a diagram illustrating a subpixel rendering method for the display panel 100 of FIG. 1 in a first frame. FIG. 5B is a diagram illustrating the subpixel rendering method for the display panel 100 of FIG. 1 in a second frame. FIG. 5C is a diagram illustrating the subpixel rendering method for the display panel 100 of FIG. 1 in a third frame.

Figure 5D:
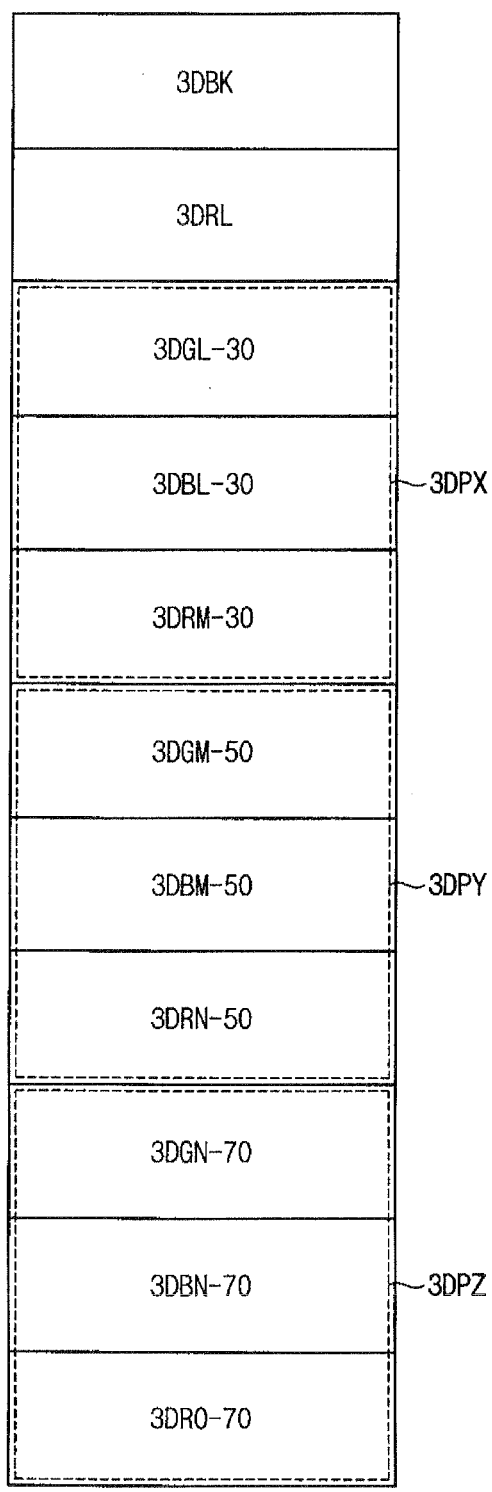
FIG. 5D is a diagram illustrating the subpixel rendering method for the display panel of FIG. 1 in a fourth frame.

FIG. 5D is a diagram illustrating the subpixel rendering method for the display panel 100 of FIG. 1 in a fourth frame.

Hereinafter, the subpixel rendering method for the display panel 100 according to an exemplary embodiment of the present invention is described with reference to FIGS. 1, 4 and 5A to 5D.

In FIGS. 5A to 5D, 2D subpixels are disposed in an eleven by six matrix, and 3D subpixels corresponding to the 2D subpixels are disposed in eleven rows. A position of the 3D pixel is shifted in each frame in a vertical direction. In an exemplary embodiment of the present invention, the 2D subpixels and the 3D subpixels are physically fixed. The shape of the 3D pixel may be defined according to subpixel rendering values, and a position of the 3D pixel may be shifted according to the subpixel rendering values.

For example, 2D subpixels RK31 to BK32 in a first row correspond to a first 3D subpixel 3 DBK. 2D subpixels RL11 to BL12 in a second row correspond to a second 3D subpixel 3DRL. 2D subpixels RL21 to BL22 in a third row correspond to a third 3D subpixel 3DGL. 2D subpixels RL31 to BL32 in a fourth row correspond to a fourth 3D subpixel 3 DBL. 2D subpixels RM11 to BM12 in a fifth row correspond to a fifth 3D subpixel 3DRM. 2D subpixels RM21 to BO12 in sixth to eleventh rows correspond to sixth to eleventh subpixels 3DGM to 3DRO.

In an exemplary embodiment of the present invention, the 3D pixels 3DPX, 3DPY and 3DPZ are shifted up or down in a vertical direction of the display panel 100 every four frames. For example, a frame rate of the display panel 100 may be about 120 Hz. Alternately, the frame rate of the display panel 100 may be greater than 120 Hz. Further, the up/down shift of the 3D pixels may occur in less or more than four frames.

Referring to FIGS. 1, 4 and 5A, an X-th 3D pixel 3DPX includes 3D subpixels 3DRL, 3DGL and 3 DBL in second to fourth rows. The X-th 3D pixel 3DPX displays a 3D image having a red grayscale of 30, a green grayscale of 30 and a blue grayscale of 30.

For example, the second 3D subpixel 3DRL may be made to correspond to the 2D subpixel RL11 which is one of 2D red subpixels in the second row by the light converting element 200 according to a viewpoint of a viewer. The subpixel rendering part 322 generates grayscale data for the 2D subpixel RL11 to represent the red grayscale of 30. The third 3D subpixel 3DGL may be made to correspond to the 2D subpixel GL21 which is one of 2D green subpixels in the third row by the light converting element 200 according to the viewpoint of the viewer. The subpixel rendering part 322 generates grayscale data for the 2D subpixel GL21 to represent the green grayscale of 30. The fourth 3D subpixel 3 DBL may be made to correspond to the 2D subpixel BL31 which is one of 2D blue subpixels in the fourth row by the light converting element 200 according to the viewpoint of the viewer.

The subpixel rendering part 322 generates grayscale data for the 2D subpixel BL31 to represent the blue grayscale of 30.

In a first frame, a position of the X-th 3D pixel 3DPX is defined as a first position.

A Y-th 3D pixel 3DPY includes 3D subpixels 3DRM, 3DGM and 3 DBM in fifth to seventh rows. The Y-th 3D pixel 3DPY displays a 3D image having a red grayscale of 50, a green grayscale of 50 and a blue grayscale of 50. In the first frame, a position of the Y-th 3D pixel 3DPY is defined as a fourth position.

A Z-th 3D pixel 3DPZ includes 3D subpixels 3DRN, 3DGN and 3 DBN in eighth to tenth rows. The Z-th 3D pixel 3DPZ displays a 3D image having a red grayscale of 70, a green grayscale of 70 and a blue grayscale of 70. In the first frame, a position of the Z-th 3D pixel 3DPZ is defined as a seventh position.

Referring to FIGS. 1, 4 and 5B, the X-th to Z-th 3D pixels 3DPX to 3DPZ are shifted in an upper direction in a second frame. For example, the X-th to Z-th 3D pixels 3DPX to 3DPZ are shifted in the upper direction depending on a height of a 3D subpixel.

In an exemplary embodiment of the present invention, for purposes of description, the input image data RGB inputted in the subpixel rendering part 322 in the second frame are the same or substantially the same as the input image data RGB inputted in the subpixel rendering part 322 in the first frame.

The X-th 3D pixel 3DPX includes 3D subpixels 3 DBK, 3DRL and 3DGL in first to third rows. The X-th 3D pixel 3DPX displays a 3D image having a red grayscale of 30, a green grayscale of 30 and a blue grayscale of 30. In the second frame, a position of the X-th 3D pixel 3DPX is defined as a second position.

The Y-th 3D pixel 3DPY includes 3D subpixels 3 DBL, 3DRM and 3DGM in fourth to sixth rows. The Y-th 3D pixel 3DPY displays a 3D image having a red grayscale of 50, a green grayscale of 50 and a blue grayscale of 50. In the second frame, a position of the Y-th 3D pixel 3DPY is defined as a fifth position.

The Z-th 3D pixel 3DPZ includes 3D subpixels 3 DBM, 3DRN and 3DGN in seventh to ninth rows. The Z-th 3D pixel 3DPZ displays a 3D image having a red grayscale of 70, a green grayscale of 70 and a blue grayscale of 70. In the second frame, a position of the Z-th 3D pixel 3DPZ is defined as an eighth position.

For convenience of description, the grayscale data represented by the 3D pixels 3DPX to 3DPZ in the second frame are the same or substantially the same as grayscale data represented by the 3D pixels 3DPX to 3DPZ in the first frame in the present exemplary embodiment. However, exemplary embodiments of the present invention are not limited thereto. In the second frame, image data which is lost when the 2D image data having a relatively higher resolution is converted to the 3D image data having a relatively lower resolution may be displayed. Accordingly, a frame rate of the 3D image may decrease, but a resolution of the 3D image may increase. For example, the lost image data may be image data having a viewpoint different from a viewpoint of the image data in the first frame.

Referring to FIGS. 1, 4 and 5C, the X-th to Z-th 3D pixels 3DPX to 3DPZ are shifted in a lower direction in a third frame. For example, the X-th to Z-th 3D pixels 3DPX to 3DPZ are shifted in the lower direction depending on a height of a 3D subpixel, and thus, the X-th to Z-th 3D pixels 3DPX to 3DPZ may go back to the positions in the first frame.

In an exemplary embodiment of the present invention, for purposes of description, the input image data RGB inputted in the subpixel rendering part 322 in the third frame are the same or substantially the same as the input image data RGB inputted in the subpixel rendering part 322 in the second frame.

The X-th 3D pixel 3DPX includes 3D subpixels 3DRL, 3DGL and 3 DBL in second to fourth rows. The X-th 3D pixel 3DPX displays a 3D image having a red grayscale of 30, a green grayscale of 30 and a blue grayscale of 30. In the third frame, a position of the X-th 3D pixel 3DPX is the first position.

The Y-th 3D pixel 3DPY includes 3D subpixels 3DRM, 3DGM and 3 DBM in fifth to seventh rows. The Y-th 3D pixel 3DPY displays a 3D image having a red grayscale of 50, a green grayscale of 50 and a blue grayscale of 50. In the third frame, a position of the Y-th 3D pixel 3DPY is the fourth position.

The Z-th 3D pixel 3DPZ includes 3D subpixels 3DRN, 3DGN and 3 DBN in eighth to tenth rows. The Z-th 3D pixel 3DPZ displays a 3D image having a red grayscale of 70, a green grayscale of 70 and a blue grayscale of 70. In the third frame, a position of the Z-th 3D pixel 3DPZ is the seventh position.

Referring to FIGS. 1, 4 and 5D, the X-th to Z-th 3D pixels 3DPX to 3DPZ are shifted in a lower direction in a fourth frame. For example, the X-th to Z-th 3D pixels 3DPX to 3DPZ are shifted in the lower direction depending on a height of a 3D subpixel.

In an exemplary embodiment of the present invention, for purposes of description, the input image data RGB inputted in the subpixel rendering part 322 in the fourth frame are the same or substantially the same as the input image data RGB inputted in the subpixel rendering part 322 in the third frame.

The X-th 3D pixel 3DPX includes 3D subpixels 3DGL, 3 DBL and 3DRM in third to fifth rows. The X-th 3D pixel 3DPX displays a 3D image having a red grayscale of 30, a green grayscale of 30 and a blue grayscale of 30. In the fourth frame, a position of the X-th 3D pixel 3DPX is defined as a third position.

The Y-th 3D pixel 3DPY includes 3D subpixels 3DGM, 3 DBM and 3DRN in sixth to eighth rows. The Y-th 3D pixel 3DPY displays a 3D image having a red grayscale of 50, a green grayscale of 50 and a blue grayscale of 50. In the fourth frame, a position of the Y-th 3D pixel 3DPY is defined as a sixth position.

The Z-th 3D pixel 3DPZ includes 3D subpixels 3DGN, 3 DBN and 3DRO in ninth to eleventh rows. The Z-th 3D pixel 3DPZ displays a 3D image having a red grayscale of 70, a green grayscale of 70 and a blue grayscale of 70. In the fourth frame, a position of the Z-th 3D pixel 3DPZ is defined as a ninth position.

The 3D pixels 3DPX, 3DPY and 3DPZ have been described above as having grayscales of 30, 50 and 70 respectively. However, the present invention is not limited thereto and the grayscales of the 3D pixels 3DPX, 3DPY and 3DPZ may vary.

According to an exemplary embodiment of the present invention, the X-th to Z-th 3D pixels 3DPX to 3DPZ are shifted in an upper direction in a fifth frame. For example, the X-th to Z-th 3D pixels 3DPX to 3DPZ are shifted in the upper direction depending on a height of a 3D subpixel so that the X-th to Z-th 3D pixels 3DPX to 3DPZ may go back to the positions in the first frame.

When the image in the first or third frame is an odd frame image, the odd frame image is repeated every two frames. Thus, a frame rate of the odd frame image may be a half of a frame rate of the display panel 100. When the image in the second frame is a first even frame image, the first even frame image is repeated every four frames. Thus, a frame rate of the first even frame image may be a quarter of the frame rate of the display panel 100. When the image in the fourth frame is a second even frame image, the second even frame image is repeated every four frames. Thus, a frame rate of the second even frame image may be a quarter of the frame rate of the display panel 100.

According to an exemplary embodiment, the 3D pixels 3DPX to 3DPZ are shifted up or down each frame, and thus, the viewer may feel as if the resolution of the 3D image increases. In addition, the contours of the 3D pixels 3DPX to 3DPZ are not easily noticed by the viewer. Thus, the display quality of the 3D image may be increased.

Figure 6A:
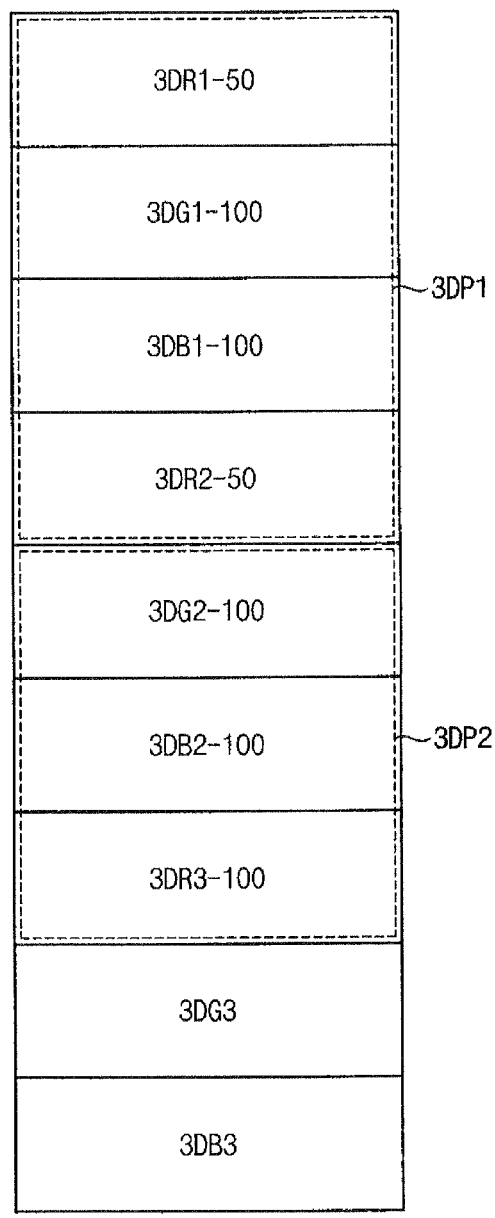
FIG. 6A is a diagram illustrating the subpixel rendering method for an uppermost 3D pixel of the display panel of FIG. 1 in the fourth frame.
Figure 6B:
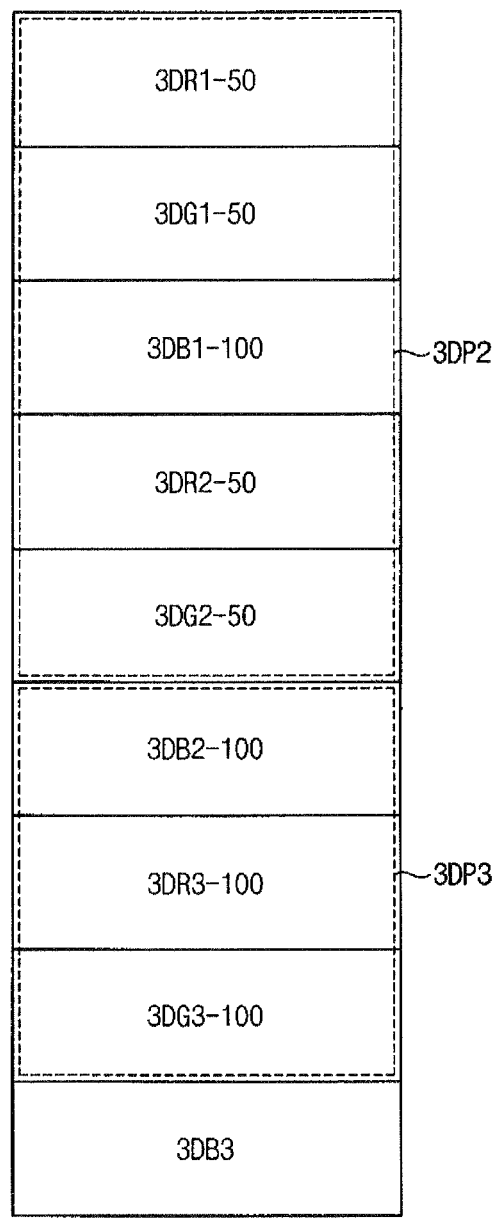
FIG. 6B is a diagram illustrating the subpixel rendering method for the uppermost 3D pixel of the display panel of FIG. 1 in the second frame.

FIG. 6A is a diagram illustrating the subpixel rendering method for an uppermost 3D pixel of the display panel 100 of FIG. 1 in the fourth frame. FIG. 6B is a diagram illustrating the subpixel rendering method for the uppermost 3D pixel of the display panel of FIG. 1 in the second frame.

As illustrated in FIGS. 5A to 5D, in the subpixel rendering method, the 3D pixel is shifted in the vertical direction depending on the height of the 3D subpixel. When the 3D pixel is shifted in the vertical direction, an incomplete 3D pixel including less than three 3D subpixels may be formed at an uppermost portion or a lowermost portion of the display panel 100.

Hereinafter, a subpixel rendering method for the incomplete 3D pixel at the uppermost portion or the lowermost portion of the display panel 100 is described with reference to FIGS. 4, 5A to 5D and 6A to 6B.

Referring to FIGS. 4, 5D and 6A, the 3D pixels are shifted in the lower direction depending on the height of the 3D subpixel in the fourth frame. When the first 3D pixel which is the uppermost 3D pixel of the display panel 100 is shifted in the lower direction, a 3D subpixel 3DR1 remains at the uppermost portion of the display panel 100 and thus the first 3D pixel becomes an incomplete 3D pixel.

In the subpixel rendering method according to an exemplary embodiment of the present invention, the first 3D pixel 3DP1 includes first to fourth 3D subpixels 3DR1, 3DG1, 3DB1 and 3DR2. When the first 3D pixel 3DP1 represents a red grayscale of 100, a green grayscale of 100 and a blue grayscale of 100, the first 3D pixel 3DP1 includes two 3D red subpixels 3DR1 and 3DR2 and thus the first and fourth 3D subpixels 3DR1 and 3DR2 each have grayscale data corresponding to a red grayscale of 50. The second and third 3D subpixels 3DG1 and 3 DB1 respective have grayscale data corresponding to the green grayscale of 100 and grayscale data corresponding to the blue grayscale of 100.

Referring to FIGS. 4, 5B and 6B, the 3D pixels are shifted in the upper direction depending on the height of the 3D subpixel in the second frame. When the first 3D pixel which is the uppermost 3D pixel of the display panel 100 is shifted in the upper direction, the first 3D pixel includes two 3D subpixels 3DR1 and 3DG1 and thus the first 3D pixel became an incomplete 3D pixel.

In the subpixel rendering method according to an exemplary embodiment of the present invention, the first 3D pixel is merged into the second 3D pixel 3DP2. Accordingly, the second 3D pixel 3DP2 includes first to fifth 3D subpixels 3DR1, 3DG1, 3 DB1, 3DR2 and 3DG2. When the second 3D pixel 3DP2 represents a red grayscale of 100, a green grayscale of 100 and a blue grayscale of 100, the second 3D pixel 3DP2 includes two 3D red subpixels 3DR1 and 3DR2 and thus the first and fourth 3D subpixels 3DR1 and 3DR2 each have grayscale data corresponding to a red grayscale of 50. The second 3D pixel 3DP2 includes two 3D green subpixels 3DG1 and 3DG2 and thus the second and fifth 3D subpixels 3DG1 and 3DG2 each have grayscale data corresponding to a green grayscale of 50. The third 3D subpixel 3 DB1 has grayscale data corresponding to the blue grayscale of 100.

The incomplete 3D pixel positioned at the lowermost portion of the display panel 100 may be operated in the same or substantially the same way as the incomplete 3D pixel positioned at the uppermost portion of the display panel 100.

Figure 7A:
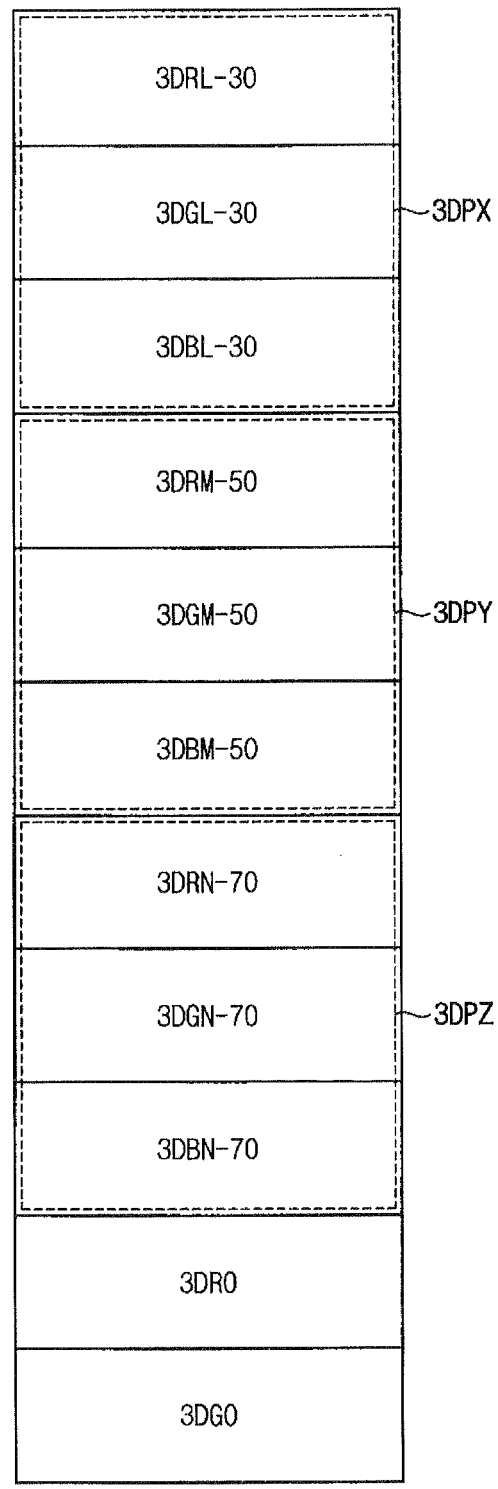
FIG. 7A is a diagram illustrating a subpixel rendering method for a display panel according to an exemplary embodiment of the present invention in a first frame.
Figure 7B:
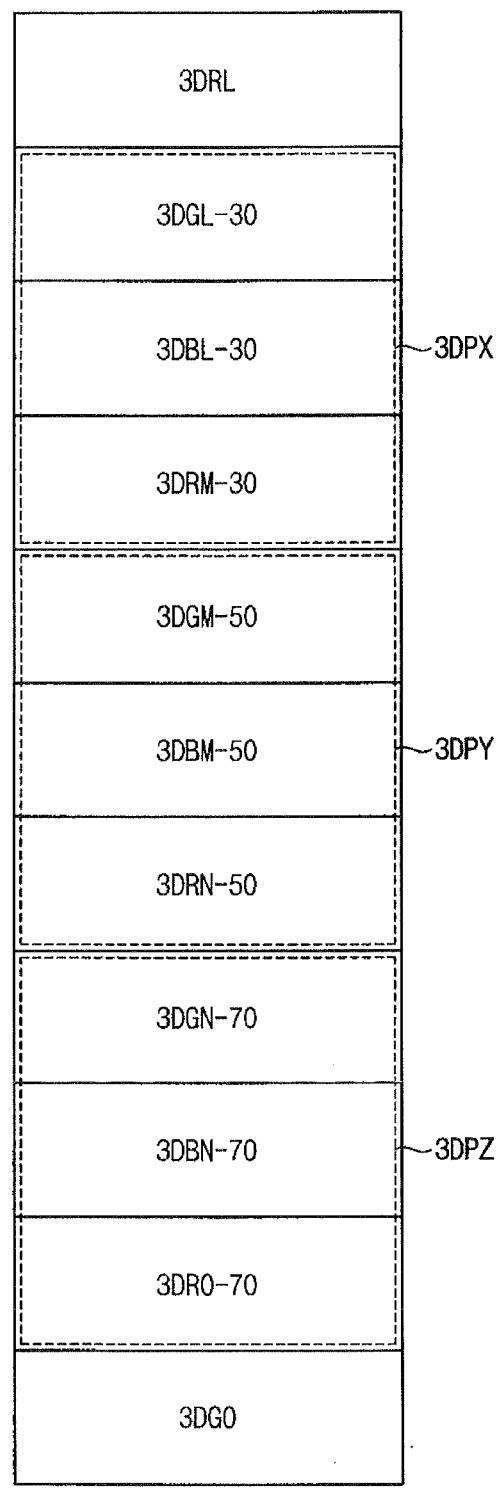
FIG. 7B is a diagram illustrating the subpixel rendering method for the display panel of FIG. 7A in a second frame.
Figure 7C:
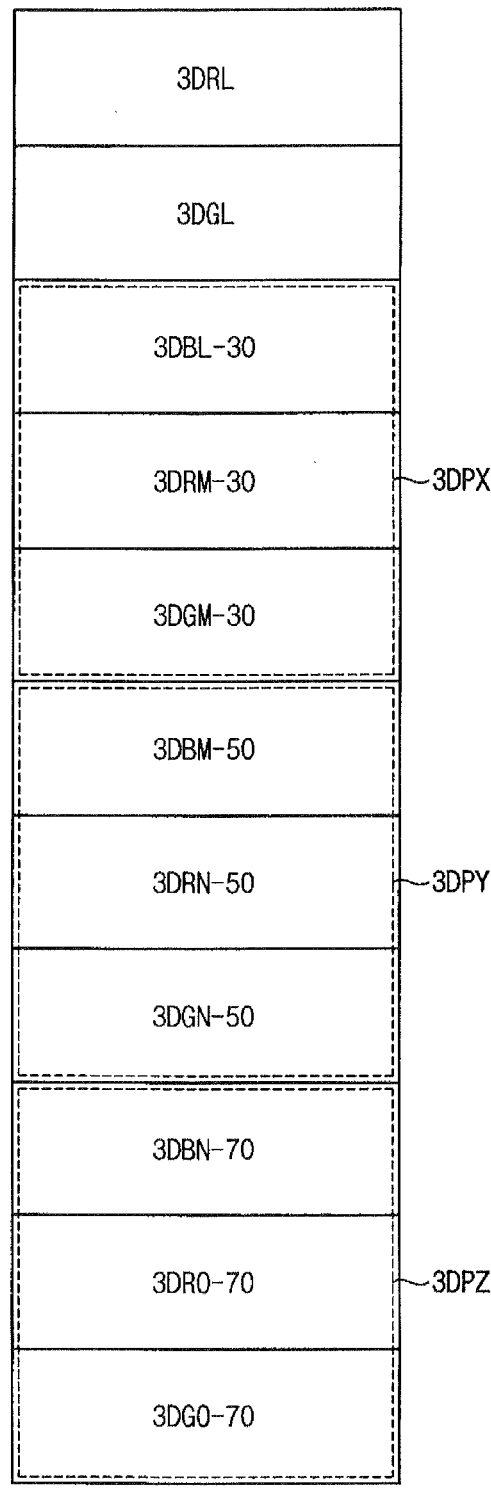
FIG. 7C is a diagram illustrating the subpixel rendering method for the display panel of FIG. 7A in a third frame.

FIG. 7A is a diagram illustrating a subpixel rendering method for a display panel 100 according to an exemplary embodiment of the present invention in a first frame. FIG. 7B is a diagram illustrating the subpixel rendering method for the display panel 100 of FIG. 7A in a second frame. FIG. 7C is a diagram illustrating the subpixel rendering method for the display panel 100 of FIG. 7A in a third frame.

A display apparatus and a method of displaying the 3D image according to the present exemplary embodiment are substantially the same as the display apparatus and the method of displaying the 3D image described with reference to FIGS. 1 to 6B except that the 3D pixels are shifted up or down in the vertical direction every three frames.

Hereinafter, the subpixel rendering method for the display panel 100 according to an exemplary embodiment is described with reference to FIGS. 1, 4 and 7A to 7C.

In FIGS. 7A to 7C, 2D subpixels are disposed in an eleven by six matrix and 3D subpixels corresponding to the 2D subpixels are disposed in eleven rows. A position of the 3D pixel is shifted each frame in a vertical direction. In an exemplary embodiment of the present invention, the 2D subpixels and the 3D subpixels may be physically fixed. The shape of the 3D pixel is defined according to subpixel rendering values, and a position of the 3D pixel may be shifted according to the subpixel rendering values.

For example, 2D subpixels RL11 to BL12 in a first row correspond to a first 3D subpixel 3DRL. 2D subpixels RL21 to BL22 in a second row correspond to a second 3D subpixel 3DGL. 2D subpixels RL31 to BL32 in a third row correspond to a third 3D subpixel 3 DBL. 2D subpixels RM11 to BM12 in a fourth row correspond to a fourth 3D subpixel 3DRM. 2D subpixels RM21 to BM22 in a fifth row correspond to a fifth 3D subpixel 3DRM. 2D subpixels RM31 to BO22 in sixth to eleventh rows correspond to sixth to eleventh subpixels 3 DBM to 3DGO.

In an exemplary embodiment of the present invention, the 3D pixels 3DPX, 3DPY and 3DPZ are shifted up or down in a vertical direction of the display panel 100 every three frames. For example, a frame rate of the display panel 100 may be about 120 Hz. Alternately, the frame rate of the display panel 100 may be greater than 120 Hz.

Referring to FIGS. 1, 4 and 7A, an X-th 3D pixel 3DPX includes 3D subpixels 3DRL, 3DGL and 3 DBL in first to third rows. The X-th 3D pixel 3DPX displays a 3D image having a red grayscale of 30, a green grayscale of 30 and a blue grayscale of 30.

For example, the second 3D subpixel 3DRL may be made to correspond to the 2D subpixel RL11 which is one of 2D red subpixels in the first row by the light converting element 200 according to a viewpoint of a viewer. The subpixel rendering part 322 generates grayscale data for the 2D subpixel RL11 to represent the red grayscale of 30. The third 3D subpixel 3DGL may be made to correspond to the 2D subpixel GL21 which is one of 2D green subpixels in the second row by the light converting element 200 according to the viewpoint of the viewer. The subpixel rendering part 322 generates grayscale data for the 2D subpixel GL21 to represent the green grayscale of 30. The fourth 3D subpixel 3 DBL may be made to correspond to the 2D subpixel BL31 which is one of 2D blue subpixels in the third row by the light converting element 200 according to the viewpoint of the viewer. The subpixel rendering part 322 generates grayscale data for the 2D subpixel BL31 to represent the blue grayscale of 30.

In a first frame, a position of the X-th 3D pixel 3DPX is defined as a first position.

A Y-th 3D pixel 3DPY includes 3D subpixels 3DRM, 3DGM and 3 DBM in fourth to sixth rows. The Y-th 3D pixel 3DPY displays a 3D image having a red grayscale of 50, a green grayscale of 50 and a blue grayscale of 50. In the first frame, a position of the Y-th 3D pixel 3DPY is defined as a fourth position.

A Z-th 3D pixel 3DPZ includes 3D subpixels 3DRN, 3DGN and 3 DBN in seventh to ninth rows. The Z-th 3D pixel 3DPZ displays a 3D image having a red grayscale of 70, a green grayscale of 70 and a blue grayscale of 70. In the first frame, a position of the Z-th 3D pixel 3DPZ is defined as a seventh position.

Referring to FIGS. 1, 4 and 7B, the X-th to Z-th 3D pixels 3DPX to 3DPZ are shifted in a lower direction in a second frame. For example, the X-th to Z-th 3D pixels 3DPX to 3DPZ are shifted in the lower direction depending on a height of a 3D subpixel.

In an exemplary embodiment of the present invention, for purposes of description, the input image data RGB inputted in the subpixel rendering part 322 in the second frame are the same or substantially the same as the input image data RGB inputted in the subpixel rendering part 322 in the first frame.

The X-th 3D pixel 3DPX includes 3D subpixels 3DGL, 3 DBL and 3DRM in second to fourth rows. The X-th 3D pixel 3DPX displays a 3D image having a red grayscale of 30, a green grayscale of 30 and a blue grayscale of 30. In the second frame, a position of the X-th 3D pixel 3DPX is defined as a second position.

The Y-th 3D pixel 3DPY includes 3D subpixels 3DGM, 3 DBM and 3DRN in fifth to seventh rows. The Y-th 3D pixel 3DPY displays a 3D image having a red grayscale of 50, a green grayscale of 50 and a blue grayscale of 50. In the second frame, a position of the Y-th 3D pixel 3DPY is defined as a fifth position.

The Z-th 3D pixel 3DPZ includes 3D subpixels 3DGN, 3 DBN and 3DRO in eighth to tenth rows. The Z-th 3D pixel 3DPZ displays a 3D image having a red grayscale of 70, a green grayscale of 70 and a blue grayscale of 70. In the second frame, a position of the Z-th 3D pixel 3DPZ is defined as an eighth position.

Referring to FIGS. 1, 4 and 7C, the X-th to Z-th 3D pixels 3DPX to 3DPZ are shifted in a lower direction in a third frame. For example, the X-th to Z-th 3D pixels 3DPX to 3DPZ are shifted in the lower direction by a height of a 3D subpixel.

In an exemplary embodiment of the present invention, for purposes of description, the input image data RGB inputted in the subpixel rendering part 322 in the third frame are the same or substantially the same as the input image data RGB inputted in the subpixel rendering part 322 in the second frame.

The X-th 3D pixel 3DPX includes 3D subpixels 3 DBL, 3DRM and 3DGM in third to fifth rows. The X-th 3D pixel 3DPX displays a 3D image having a red grayscale of 30, a green grayscale of 30 and a blue grayscale of 30. In the third frame, a position of the X-th 3D pixel 3DPX is defined as a third position.

The Y-th 3D pixel 3DPY includes 3D subpixels 3 DBM, 3DRN and 3DGN in sixth to eighth rows. The Y-th 3D pixel 3DPY displays a 3D image having a red grayscale of 50, a green grayscale of 50 and a blue grayscale of 50. In the third frame, a position of the Y-th 3D pixel 3DPY is defined as a sixth position.

The Z-th 3D pixel 3DPZ includes 3D subpixels 3 DBN, 3DRO and 3DGO in ninth to eleventh rows. The Z-th 3D pixel 3DPZ displays a 3D image having a red grayscale of 70, a green grayscale of 70 and a blue grayscale of 70. In the third frame, a position of the Z-th 3D pixel 3DPZ is defined as a ninth position.

According to an exemplary embodiment of the present invention, the X-th to Z-th 3D pixels 3DPX to 3DPZ are shifted in an upper direction in a fourth frame. For example, the X-th to Z-th 3D pixels 3DPX to 3DPZ are shifted in the upper direction by twice of a height of a 3D subpixel and thus the X-th to Z-th 3D pixels 3DPX to 3DPZ may be back to the positions in the first frame.

The images are repeated every three frames. Thus, a frame rate of a frame image may be ⅓ of the frame rate of the display panel 100.

According to an exemplary embodiment of the present invention, the 3D pixels 3DPX to 3DPZ are shifted up or down each frame and thus the viewer may feel as if the resolution of the 3D image increases. The contours of the 3D pixels 3DPX to 3DPZ are not easily noticed by the viewer. Thus, the display quality of the 3D image may be increased.

Figure 8:
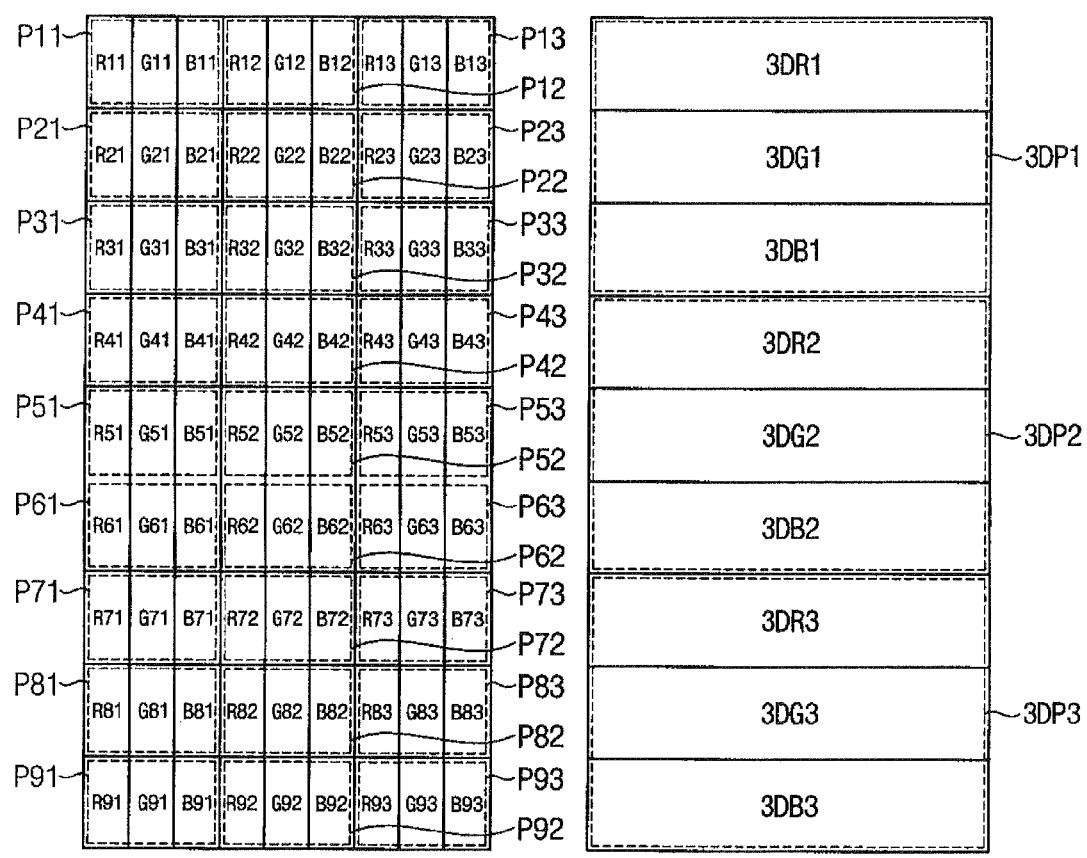
FIG. 8 is a plan view illustrating a 2D pixel structure and a 3D pixel structure of a display panel according to an exemplary embodiment of the present invention.

FIG. 8 is a plan view illustrating a 2D pixel structure and a 3D pixel structure of a display panel according to an exemplary embodiment of the present invention.

A display apparatus and a method of displaying the 3D image according to the present exemplary embodiment are the same or substantially the same as the display apparatus and the method of displaying the 3D image described with reference to FIGS. 1 to 6B except that a 3D pixel corresponds to nine 2D pixels which are disposed in a three by three matrix.

Referring to FIGS. 1 and 8, the display panel 100 includes a plurality of the 2D pixels P11 to P93. The 2D pixels P11 to P93 are disposed in a matrix form.

A first 2D pixel P11 includes a first 2D red subpixel R11, a first 2D green subpixel G11 and a first 2D blue subpixel B11.

A second 2D pixel P12 is disposed adjacent to the first 2D pixel P11 in the first direction D1. The second 2D pixel P12 includes a second 2D red subpixel R12, a second 2D green subpixel G12 and a second 2D blue subpixel B12.

A third 2D pixel P13 is disposed adjacent to the second 2D pixel P12 in the first direction D1. The third 2D pixel P13 includes a third 2D red subpixel R13, a third 2D green subpixel G13 and a third 2D blue subpixel B13.

A fourth 2D pixel P21 is disposed adjacent to the first 2D pixel P11 in the second direction D2. The fourth 2D pixel P21 includes a fourth 2D red subpixel R21, a fourth 2D green subpixel G21 and a fourth 2D blue subpixel B21.

A fifth 2D pixel P22 is disposed adjacent to the fourth 2D pixel P21 in the first direction D1. The fifth 2D pixel P22 includes a fifth 2D red subpixel R22, a fifth 2D green subpixel G22 and a fifth 2D blue subpixel B22.

A sixth 2D pixel P23 is disposed adjacent to the fifth 2D pixel P22 in the first direction D1. The sixth 2D pixel P23 includes a sixth 2D red subpixel R23, a sixth 2D green subpixel G23 and a sixth 2D blue subpixel B23.

A seventh 2D pixel P31 is disposed adjacent to the fourth 2D pixel P21 in the second direction D2. The seventh 2D pixel P31 includes a seventh 2D red subpixel R31, a seventh 2D green subpixel G31 and a seventh 2D blue subpixel B31.

An eighth 2D pixel P32 is disposed adjacent to the seventh 2D pixel P31 in the first direction D1. The eighth 2D pixel P32 includes an eighth 2D red subpixel R32, an eighth 2D green subpixel G32 and an eighth 2D blue subpixel B32.

A ninth 2D pixel P33 is disposed adjacent to the eighth 2D pixel P32 in the first direction D1. The ninth 2D pixel P33 includes a ninth 2D red subpixel R33, a ninth 2D green subpixel G33 and a ninth 2D blue subpixel B33.

A pixel group including tenth to eighteenth 2D pixels P41 to P63 is disposed adjacent to a pixel group including the first to ninth 2D pixels P11 to P33. The tenth to eighteenth 2D pixels P41 to P63 are arranged in the same or substantially the same pattern as the first to ninth 2D pixels P11 to P33.

A pixel group including nineteenth to twenty-seventh 2D pixels P71 to P93 is disposed adjacent to a pixel group including the first to sixth 2D pixels P41 to P33 in the second direction D2. The nineteenth to twenty-seventh 2D pixels P71 to P93 are arranged in the same or substantially the same pattern as the tenth to eighteenth 2D pixels P41 to P63.

The 3D pixels 3DP1 to 3DP3 are included in the light converting element 200. Each of the 3D pixels 3DP1 to 3DP3 corresponds to a plurality of the 2D pixels.

In an exemplary embodiment of the present invention, one 3D pixel corresponds to nine 2D pixels which are disposed in a three by three matrix. For example, a first 3D pixel 3DP1 corresponds to the first to ninth 3D pixels P11 to P33. A second 3D pixel 3DP2 corresponds to the tenth to eighteenth 2D pixels P41 to P63. A third 3D pixel 3DP3 corresponds to the nineteenth to twenty-seventh 2D pixels P71 to P93.

For example, when the display panel 100 has a 2D resolution of 3840×2160, a 3D resolution of the display apparatus may be 1280×720.

Each of the 3D pixels 3DP1 to 3DP3 includes a plurality of 3D subpixels. For example, the 3D subpixel has a rectangular shape. The 3D subpixel may have a relatively longer side extending in the first direction D1 and a relatively shorter side extending in the second direction D2. In an exemplary embodiment, one 3D subpixel corresponds to nine 2D subpixels which are disposed in a one by nine matrix.

The first 3D pixel 3DP1 includes a first 3D red subpixel 3DR1, a first 3D green subpixel 3DG1 and a first 3D blue subpixel 3 DB1.

The second 3D pixel 3DP2 is disposed adjacent to the first 3D pixel 3DP1 in the second direction D2. The second 3D pixel 3DP2 includes a second 3D red subpixel 3DR2, a second 3D green subpixel 3DG2 and a second 3D blue subpixel 3 DB2.

The third 3D pixel 3DP3 is disposed adjacent to the second 3D pixel 3DP2 in the second direction D2. The third 3D pixel 3DP3 includes a third 3D red subpixel 3DR3, a third 3D green subpixel 3DG3 and a third 3D blue subpixel 3 DB3.

The subpixels in the first to third 3D pixels 3DP1, 3DP2 and 3DP3 are not limited to the R, G, B sequence and may vary. For example, the first 3D pixel 3DP1 may have red, green and blue sub-pixels in sequence while the second 3D pixel 3DP2 may not.

Although 2D subpixels arranged in nine rows and nine columns are illustrated in FIG. 8, the 2D subpixels represent a portion of the display panel 100. For example, the 2D subpixels arranged in nine rows and nine columns may be repeated along the first and second directions D1 and D2.

Figure 9A:
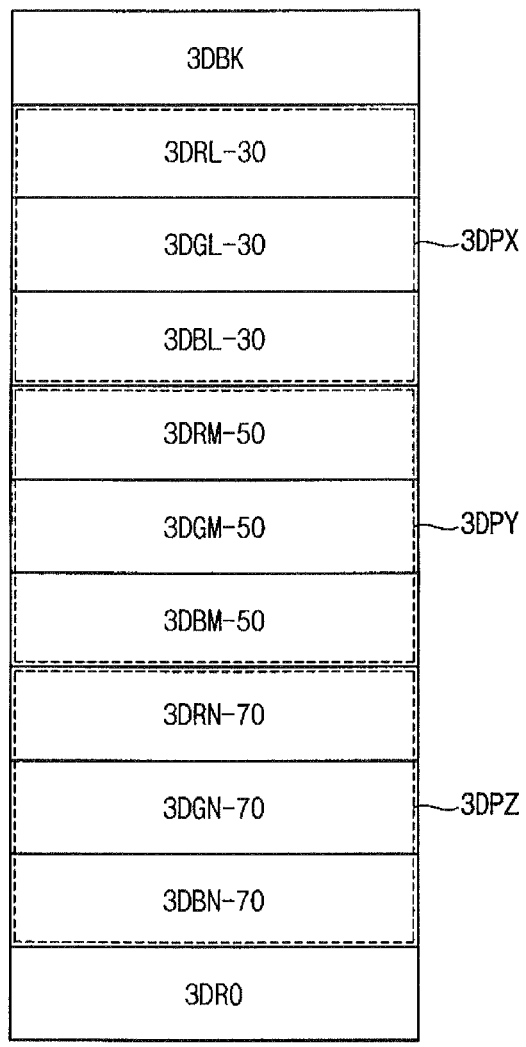
FIG. 9A is a diagram illustrating a subpixel rendering method for the display panel of FIG. 8 in a first frame.
Figure 9B:
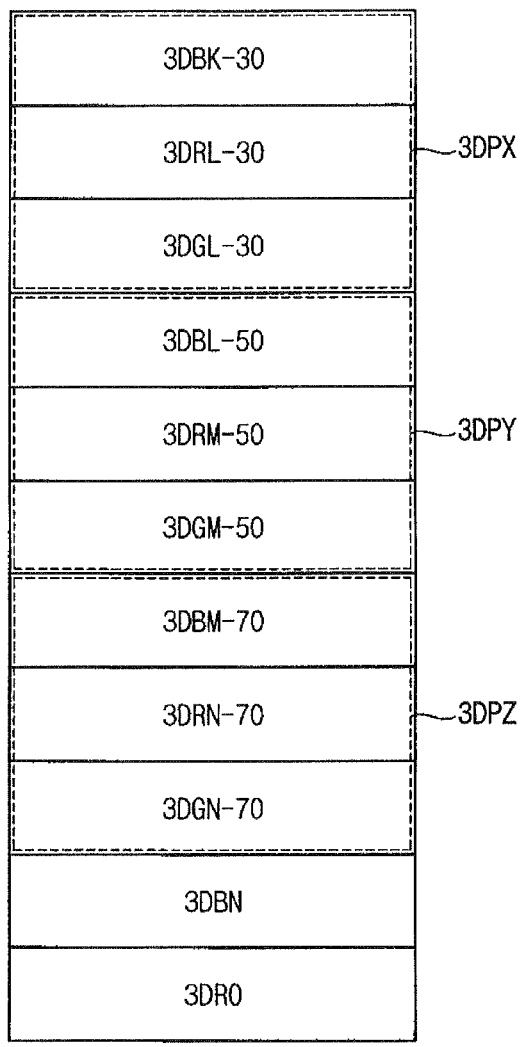
FIG. 9B is a diagram illustrating a subpixel rendering method for the display panel of FIG. 8 in a second frame.
Figure 9C:
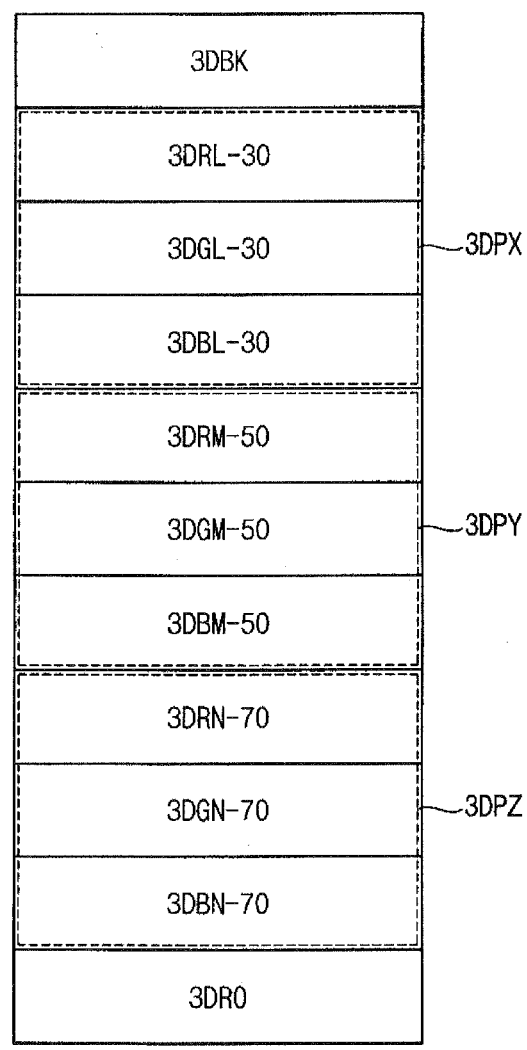
FIG. 9C is a diagram illustrating the subpixel rendering method for the display panel of FIG. 8 in a third frame.

FIG. 9A is a diagram illustrating a subpixel rendering method for the display panel 100 of FIG. 8 in a first frame. FIG. 9B is a diagram illustrating the subpixel rendering method for the display panel 100 of FIG. 8 in a second frame. FIG. 9C is a diagram illustrating the subpixel rendering method for the display panel 100 of FIG. 8 in a third frame.

Figure 9D:
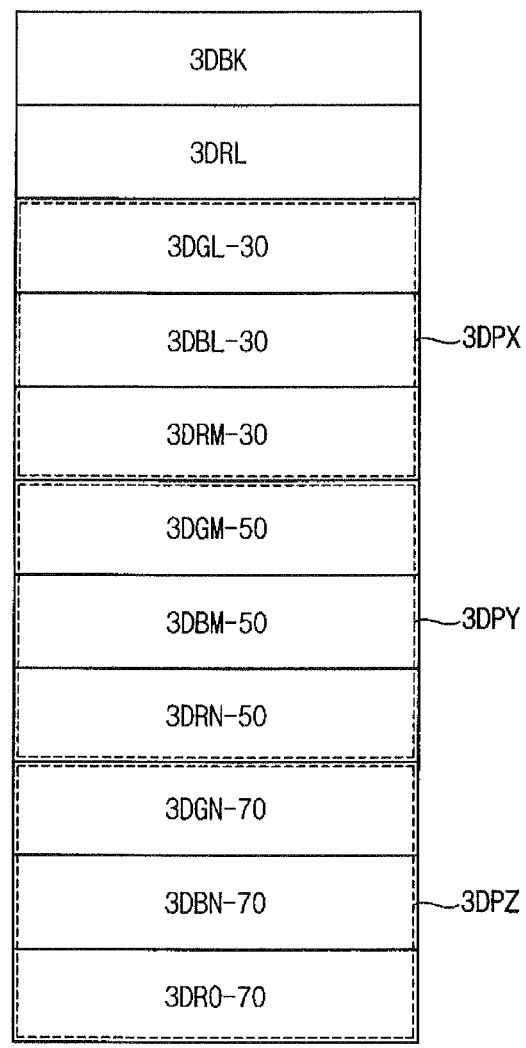
FIG. 9D is a diagram illustrating the subpixel rendering method for the display panel of FIG. 8 in a fourth frame.

FIG. 9D is a diagram illustrating the subpixel rendering method for the display panel 100 of FIG. 8 in a fourth frame.

Hereinafter, the subpixel rendering method for the display panel 100 according to an exemplary embodiment is described with reference to FIGS. 1, 4 and 9A to 9D.

For example, 2D subpixels RK31 to BK33 in a first row correspond to a first 3D subpixel 3 DBK. 2D subpixels RL11 to BL13 in a second row correspond to a second 3D subpixel 3DRL. 2D subpixels RL21 to BL23 in a third row correspond to a third 3D subpixel 3DGL. 2D subpixels RL31 to BL33 in a fourth row correspond to a fourth 3D subpixel 3 DBL. 2D subpixels RM11 to BM13 in a fifth row correspond to a fifth 3D subpixel 3DRM. 2D subpixels RM21 to BO13 in sixth to eleventh rows correspond to sixth to eleventh subpixels 3DGM to 3DRO.

In an exemplary embodiment of the present invention, the 3D pixels 3DPX, 3DPY and 3DPZ are shifted up or down in a vertical direction of the display panel 100 every four frames. For example, a frame rate of the display panel 100 may be about 120 Hz. Alternately, the frame rate of the display panel 100 may be greater than 120 Hz.

Referring to FIGS. 1, 4 and 9A, an X-th 3D pixel 3DPX includes 3D subpixels 3DRL, 3DGL and 3 DBL in second to fourth rows. The X-th 3D pixel 3DPX displays a 3D image having a red grayscale of 30, a green grayscale of 30 and a blue grayscale of 30. In a first frame, a position of the X-th 3D pixel 3DPX is defined as a first position.

Referring to FIGS. 1, 4 and 9B, the X-th to Z-th 3D pixels 3DPX to 3DPZ are shifted in an upper direction in a second frame. For example, the X-th to Z-th 3D pixels 3DPX to 3DPZ are shifted in the upper direction by a height of a 3D subpixel.

In an exemplary embodiment of the present invention, for purposes of description, the input image data RGB inputted in the subpixel rendering part 322 in the second frame are the same or substantially the same as the input image data RGB inputted in the subpixel rendering part 322 in the first frame.

The X-th 3D pixel 3DPX includes 3D subpixels 3 DBK, 3DRL and 3DGL in first to third rows. The X-th 3D pixel 3DPX displays a 3D image having a red grayscale of 30, a green grayscale of 30 and a blue grayscale of 30. In the second frame, a position of the X-th 3D pixel 3DPX is defined as a second position.

Referring to FIGS. 1, 4 and 9C, the X-th to Z-th 3D pixels 3DPX to 3DPZ are shifted in a lower direction in a third frame. For example, the X-th to Z-th 3D pixels 3DPX to 3DPZ are shifted in the lower direction depending on a height of a 3D subpixel and thus the X-th to Z-th 3D pixels 3DPX to 3DPZ may go back to the positions in the first frame.

In an exemplary embodiment of the present invention, for purposes of description, the input image data RGB inputted in the subpixel rendering part 322 in the third frame are the same or substantially the same as the input image data RGB inputted in the subpixel rendering part 322 in the second frame.

The X-th 3D pixel 3DPX includes 3D subpixels 3DRL, 3DGL and 3 DBL in second to fourth rows. The X-th 3D pixel 3DPX displays a 3D image having a red grayscale of 30, a green grayscale of 30 and a blue grayscale of 30. In the third frame, a position of the X-th 3D pixel 3DPX is the first position.

Referring to FIGS. 1, 4 and 9D, the X-th to Z-th 3D pixels 3DPX to 3DPZ are shifted in a lower direction in a fourth frame. For example, the X-th to Z-th 3D pixels 3DPX to 3DPZ are shifted in the lower direction depending on a height of a 3D subpixel.

In an exemplary embodiment of the present invention, for purposes of description, the input image data RGB inputted in the subpixel rendering part 322 in the fourth frame are the same or substantially the same as the input image data RGB inputted in the subpixel rendering part 322 in the third frame.

The X-th 3D pixel 3DPX includes 3D subpixels 3DGL, 3 DBL and 3DRM in third to fifth rows. The X-th 3D pixel 3DPX displays a 3D image having a red grayscale of 30, a green grayscale of 30 and a blue grayscale of 30. In the fourth frame, a position of the X-th 3D pixel 3DPX is defined as a third position.

According to an exemplary embodiment of the present invention, the X-th to Z-th 3D pixels 3DPX to 3DPZ are shifted in an upper direction in a fifth frame. For example, the X-th to Z-th 3D pixels 3DPX to 3DPZ are shifted in an upper direction depending on a height of a 3D subpixel and thus the X-th to Z-th 3D pixels 3DPX to 3DPZ may be back to the positions in the first frame.

According to an exemplary embodiment of the present invention, the 3D pixels 3DPX to 3DPZ are shifted up or down each frame and the viewer may feel as if the resolution of the 3D image increases. The contours of the 3D pixels 3DPX to 3DPZ are not easily noticed by the viewer. Thus, the display quality of the 3D image may be increased.

Figure 10A:
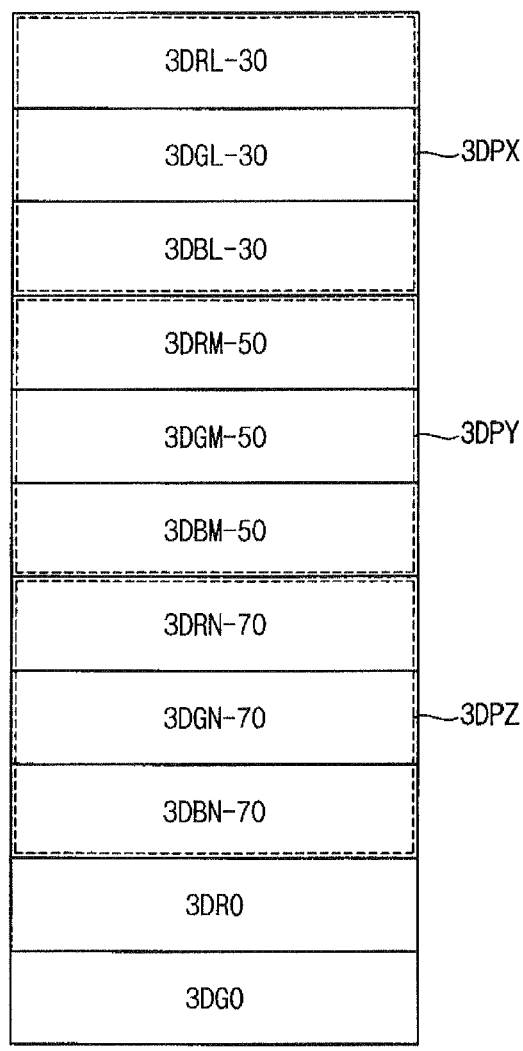
FIG. 10A is a diagram illustrating a subpixel rendering method for a display panel according to an exemplary embodiment of the present invention in a first frame.
Figure 10B:
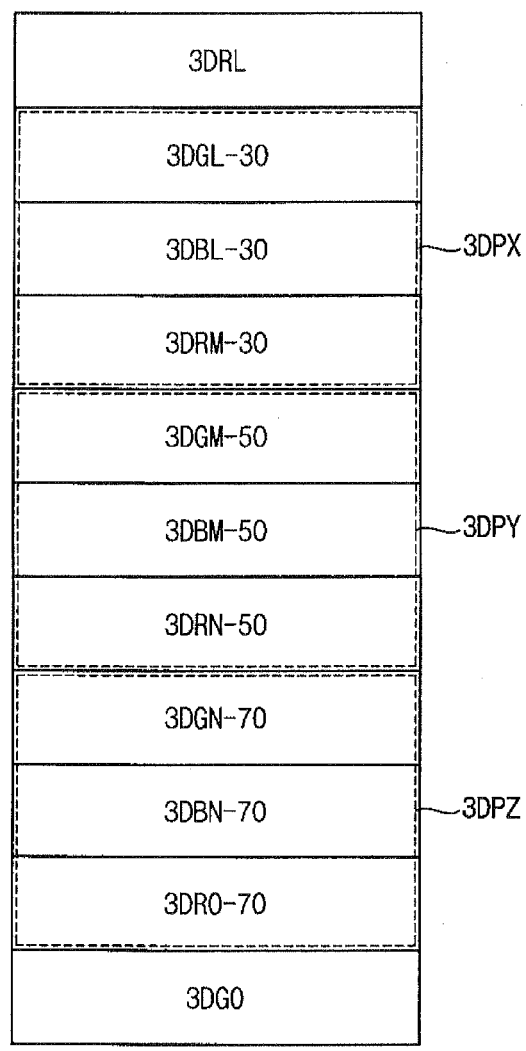
FIG. 10B is a diagram illustrating the subpixel rendering method for the display panel of FIG. 10A in a second frame.
Figure 10C:
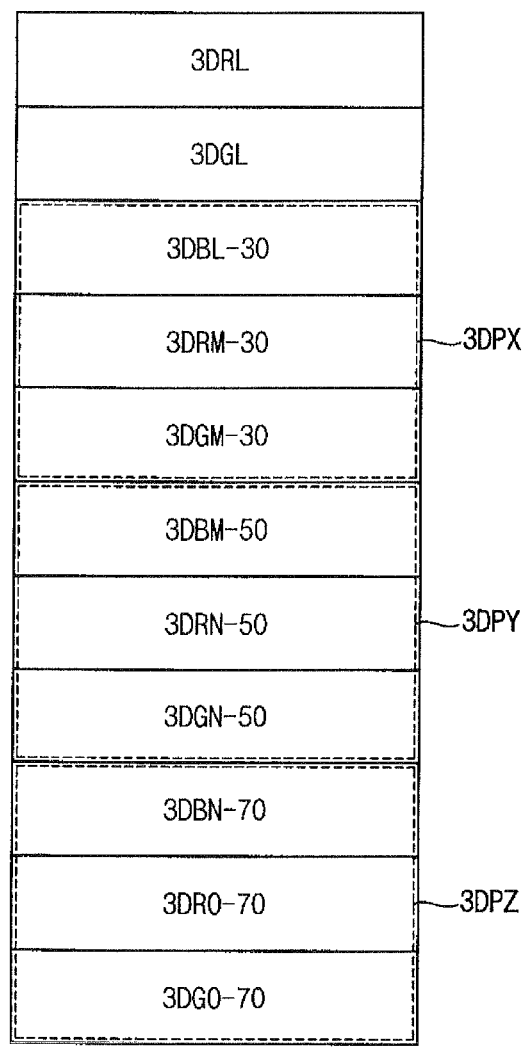
FIG. 10C is a diagram illustrating the subpixel rendering method for the display panel of FIG. 10A in a third frame.

FIG. 10A is a diagram illustrating a subpixel rendering method for a display panel 100 according to an exemplary embodiment of the present invention in a first frame. FIG. 10B is a diagram illustrating the subpixel rendering method for the display panel 100 of FIG. 10A in a second frame. FIG. 10C is a diagram illustrating the subpixel rendering method for the display panel 100 of FIG. 10A in a third frame.

A display apparatus and a method of displaying the 3D image according to the present exemplary embodiment are the same or substantially the same as the display apparatus and the method of displaying the 3D image described with reference to FIGS. 8 to 9D except that the 3D pixels are shifted up or down in the vertical direction every three frames.

Hereinafter, the subpixel rendering method for the display panel 100 according to an exemplary embodiment of the present invention is described with reference to FIGS. 1, 4 and 10A to 10C.

For example, 2D subpixels RL11 to BL13 in a first row correspond to a first 3D subpixel 3DRL. 2D subpixels RL21 to BL23 in a second row correspond to a second 3D subpixel 3DGL. 2D subpixels RL31 to BL33 in a third row correspond to a third 3D subpixel 3 DBL. 2D subpixels RM11 to BM13 in a fourth row correspond to a fourth 3D subpixel 3DRM. 2D subpixels RM21 to BM23 in a fifth row correspond to a fifth 3D subpixel 3DRM. 2D subpixels RM31 to BO23 in sixth to eleventh rows correspond to sixth to eleventh subpixels 3 DBM to 3DGO.

In an exemplary embodiment of the present invention, the 3D pixels 3DPX, 3DPY and 3DPZ are shifted up or down in a vertical direction of the display panel 100 every three frames. For example, a frame rate of the display panel 100 may be about 120 Hz. Alternately, the frame rate of the display panel 100 may be greater than 120 Hz.

Referring to FIGS. 1, 4 and 10A, an X-th 3D pixel 3DPX includes 3D subpixels 3 DBL, 3DGL and 3 DBL in first to third rows. The X-th 3D pixel 3DPX displays a 3D image having a red grayscale of 30, a green grayscale of 30 and a blue grayscale of 30. In a first frame, a position of the X-th 3D pixel 3DPX is defined as a first position.

Referring to FIGS. 1, 4 and 10B, the X-th to Z-th 3D pixels 3DPX to 3DPZ are shifted in a lower direction in a second frame. For example, the X-th to Z-th 3D pixels 3DPX to 3DPZ are shifted in the lower direction depending on a height of a 3D subpixel.

In an exemplary embodiment of the present invention, for purposes of description, the input image data RGB inputted in the subpixel rendering part 322 in the second frame are the same or substantially the same as the input image data RGB inputted in the subpixel rendering part 322 in the first frame.

The X-th 3D pixel 3DPX includes 3D subpixels 3DGL, 3 DBL and 3DRM in second to fourth rows. The X-th 3D pixel 3DPX displays a 3D image having a red grayscale of 30, a green grayscale of 30 and a blue grayscale of 30. In the second frame, a position of the X-th 3D pixel 3DPX is defined as a second position.

Referring to FIGS. 1, 4 and 10C, the X-th to Z-th 3D pixels 3DPX to 3DPZ are shifted in a lower direction in a third frame. For example, the X-th to Z-th 3D pixels 3DPX to 3DPZ are shifted in the lower direction depending on a height of a 3D subpixel.

In an exemplary embodiment of the present invention, for purposes of description, the input image data RGB inputted in the subpixel rendering part 322 in the third frame are the same or substantially the same as the input image data RGB inputted in the subpixel rendering part 322 in the second frame.

The X-th 3D pixel 3DPX includes 3D subpixels 3 DBL, 3DRM and 3DGM in third to fifth rows. The X-th 3D pixel 3DPX displays a 3D image having a red grayscale of 30, a green grayscale of 30 and a blue grayscale of 30. In the third frame, a position of the X-th 3D pixel 3DPX is defined as a third position.

According to an exemplary embodiment of the present invention, the X-th to Z-th 3D pixels 3DPX to 3DPZ are shifted in an upper direction in a fourth frame. For example, the X-th to Z-th 3D pixels 3DPX to 3DPZ are shifted in the upper direction by twice of a height of a 3D subpixel and thus the X-th to Z-th 3D pixels 3DPX to 3DPZ may go back to positions in the first frame.

According to an exemplary embodiment of the present invention, the 3D pixels 3DPX to 3DPZ are shifted up or down each frame and the viewer may feel as if the resolution of the 3D image increases. The contours of the 3D pixels 3DPX to 3DPZ may not be noticed by the viewer. Thus, the display quality of the 3D image may be increased.

The 2D and 3D subpixels described above may further included white color subpixels, for example.

As described above, in the display apparatus and the method of displaying a 3D image according to an exemplary embodiment of the present invention, a 3D pixel shifts in a first direction or in a direction opposite to the first direction so that a viewer may feel as if the resolution of the 3D image increases in the first direction. Further, this shifting prevents the contours of the 3D pixels from being noticed by the viewer. Thus, the display quality of the 3D image may be increased.

Although a exemplary embodiments of the present invention have been described, it is understood that the present invention should not be limited to these exemplary embodiments by various changes and modifications can be made by one of ordinary skill in the art will within the spirit and scope of the present invention as hereinafter claimed.

What is claimed is:

1. A display apparatus, comprising:
   a display panel including a plurality of two-dimensional ("2D") pixels, wherein each of the 2D pixels includes a corresponding plurality of 2D subpixels including at least one red 2D subpixel, at least One green 2D subpixel, and at least one blue 2D sub pixel;
   a light converting element including a three dimensional ("3D") pixel, wherein the 3D pixel corresponds to a first group of 2D pixels of the plurality of 2D pixels, and the 3D pixel includes a plurality of 3D subpixels, each of the plurality of 3D subpixels representing a single primary color and comprising two red 2D subpixels, two green 2D subpixels, and two blue 2D sub pixels, disposed in a single row; and
   a display panel driver connected to the display panel and configured to render grayscale data of the 2D subpixels such that the 3D pixel disposed at a first position in a first frame is shifted to a second position in a second frame,
   wherein in shifting from the first position to the second position, the correspondence of the 3D pixel shifts from the first group of 2D pixels of the plurality of 2D pixels to a second group of 2D pixels of the plurality of 2D pixels that is at least partially different from the first group of 2D pixels, and
   wherein the light converting element further includes at least one of an uppermost 3D pixel and a lowermost 3D pixel, including a greater number of 3D subpixels than a number of the plurality of 3D subpixels of the 3D pixel, and representing a grayscale level that is the same as a grayscale level of the 3D pixel.

2. The display apparatus of claim 1, wherein the 3D pixel is shifted in a first direction to the second position by a distance corresponding to a size of one of the 3D subpixels.

3. The display apparatus of claim 2, wherein the first direction is a vertical direction of the display panel.

4. The display apparatus of claim 1, wherein the 3D pixel is shifted in a direction opposite to a first direction so that the 3D pixel is disposed at the first position in a third frame.

5. The display apparatus of claim 4, wherein the 3D pixel is shifted in the direction opposite to the first direction so that the 3D pixel is disposed at a third position in a fourth frame.

6. The display apparatus of claim 5, wherein the 3D pixel is shifted in the first direction so that the 3D pixel is disposed at the first position in a fifth frame.

7. The display apparatus of claim 1, wherein the 3D pixel is shifted in a first direction so that the 3D pixel is disposed at a third position in a third frame.

8. The display apparatus of claim 7, wherein the 3D pixel is shifted in a direction opposite to the first direction so that the 3D pixel is disposed at the first position in a fourth frame.

9. The display apparatus of claim 1, wherein the 3D pixel is shifted in a first direction or in a direction opposite to the first direction every four frames.

10. The display apparatus of claim 1, wherein the 3D pixel is shifted in a first direction or in a direction opposite to the first direction every three frames.

11. The display apparatus of claim 1, wherein the light converting element includes a lenticular lens.

12. The display apparatus of claim 1, wherein the light converting element includes a liquid crystal lens module that is configured to be turned off in a 2D mode and configured to be turned on in a 3D mode.

13. A method of displaying a three-dimensional ("3D") image using a display panel including a plurality of two-dimensional ("2D") pixels, at least one of the 2D pixels including a plurality of 2D subpixels, each of the 2D subpixels representing a single primary color, the method comprising:
   rendering grayscale data of the 2D subpixels such that a 3D pixel is disposed at a first position in a first frame, the 3D pixel corresponding to a first group of 2D pixels of the plurality of 2D pixels, and the 3D pixel including a plurality of 3D subpixels, each of the 3D subpixels representing a single primary color; and
   rendering grayscale data of the 2D subpixels such that the 3D pixel is shifted to a second position in a second frame,
   wherein in shifting from the first position to the second position, the correspondence of the 3D pixel shifts from the first group of 2D pixels of the plurality of 2D pixels to a second group of 2D pixels of the plurality of 2D pixels that is at least partially different from the first group of 2D pixels,
   wherein each of the plurality of 3D subpixels represents a single primary color and comprises two red 2D subpixels, two green 2D subpixels, and two blue 2D sub pixels, disposed in a single row, and
   wherein at least one of an uppermost 3D pixel and a lowermost 3D pixel, including a greater number of 3D subpixel than a number of the plurality of 3D subpixels of the 3D pixel, and representing a grayscale level that is the same as a grayscale level of the 3D pixel.

14. The method of claim 13, wherein the 3D pixel is shifted in a first direction to the second position by a distance corresponding to a size of one of the 3D subpixels.

15. The method of claim 14, wherein the first direction is a vertical direction of the display panel.

16. The method of claim 13, wherein the 3D pixel is shifted in a direction opposite to a first direction so that the 3D pixel is disposed at the first position in a third frame.

17. The method of claim 16, wherein the 3D pixel is shifted in the direction opposite to the first direction so that the 3D pixel is disposed at a third position in a fourth frame.

18. The method of claim 17, wherein the 3D pixel is shifted in the first direction so that the 3D pixel is disposed at the first position in a fifth frame.

19. The method of claim 13, wherein the 3D pixel is shifted in a first direction so that the 3D pixel is disposed at a third position in a third frame.

20. The method of claim 19, wherein the 3D pixel is shifted in a direction opposite to the first direction so that the 3D pixel is disposed at the first position in a fourth frame.

21. The method of claim 13, wherein the 3D pixel is shifted in a first direction or in a direction opposite to the first direction every four frames.

22. The method of claim 13, wherein the 3D pixel is shifted in a first direction or in a direction opposite to the first direction every three frames.

23. A display apparatus, comprising:
- a display panel including a plurality of two-dimensional ("2D") pixels, each of the 2D pixels including at least a first 2D subpixel representing red, a second 2D subpixel representing blue, and a third 2D subpixel representing green;
- a light converting element including a three-dimensional ("3D") pixel corresponding to a first group of 2D pixels of the plurality of 2D pixels, the 3D pixel including at least a first 3D subpixel representing red and including at least one first, second, and third 2D subpixel, a second 3D subpixel representing blue and including at least one first, second, and third 2D subpixel, and a third 3D subpixel representing green and including at least one first, second, and third 2D subpixel; and
- a display panel driver configured to change a grayscale of at least one of the plurality of 2D pixels so that the 3D pixel shifts in a first or second direction when an image frame changes,
- wherein in shifting from the first position to the second position, the correspondence of the 3D pixel shifts from the first group of 2D pixels of the plurality of 2D pixels to a second group of 2D pixels of the plurality of 2D pixels that is at least partially different from the first group of 2D pixels,
- wherein each of the plurality of 3D subpixels represents a single primary color and comprises two red 2D subpixels, two green 2D subpixels, and two blue 2D sub pixels, disposed in a single row, and
- wherein the light converting element further includes at least one of an uppermost 3D pixel and a lowermost 3D pixel, including a greater number of 3D subpixels than a number of the plurality of 3D subpixels of the 3D pixel, and representing a grayscale level that is the same as a grayscale level of the 3D pixel.

* * * * *